(12) United States Patent
Dallaire-Demers et al.

(10) Patent No.: US 11,551,133 B2
(45) Date of Patent: Jan. 10, 2023

(54) PREPARING CORRELATED FERMIONIC STATES ON A QUANTUM COMPUTER

(71) Applicant: President and Fellows of Harvard College, Cambridge, MA (US)

(72) Inventors: Pierre-Luc Dallaire-Demers, Cambridge, MA (US); Jhonathan Romero Fontalvo, Somerville, MA (US); Alan Aspuru-Guzik, Cambridge, MA (US); Libor Veis, Prague (CZ)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 0 days.

(21) Appl. No.: 16/955,287

(22) PCT Filed: Dec. 21, 2018

(86) PCT No.: PCT/US2018/067093
§ 371 (c)(1),
(2) Date: Jun. 18, 2020

(87) PCT Pub. No.: WO2019/126644
PCT Pub. Date: Jun. 27, 2019

(65) Prior Publication Data
US 2020/0394549 A1 Dec. 17, 2020

Related U.S. Application Data

(60) Provisional application No. 62/608,972, filed on Dec. 21, 2017.

(51) Int. Cl.
*G06N 10/00* (2022.01)

(52) U.S. Cl.
CPC ..................... *G06N 10/00* (2019.01)

(58) Field of Classification Search
CPC ........ G06N 10/00; G06N 10/40; G06F 17/16; G06F 15/16
See application file for complete search history.

(56) References Cited

U.S. PATENT DOCUMENTS

| 11,106,993 B1* | 8/2021 | Dallaire-Demers ... G06N 5/003 |
| 2020/0057957 A1* | 2/2020 | Johnson .................. G06F 17/14 |
| 2020/0104740 A1* | 4/2020 | Cao ......................... G06N 10/00 |

FOREIGN PATENT DOCUMENTS

WO  WO-2019/126644 A1  6/2019

OTHER PUBLICATIONS

Babbush et al., "Chemical basis of Trotter-Suzuki errors in quantum chemistry simulation," Physical Review A, 91: 022311 (2015).
(Continued)

*Primary Examiner* — Dinh T Le
(74) *Attorney, Agent, or Firm* — Alexander Akhtezer; Erik A. Huestis; Foley Hoag LLP

(57) ABSTRACT

Preparation of correlated fermionic states on a quantum computer for determining a ground state of a correlated fermionic system is provided. In various embodiments, a quantum circuit is provided that comprises a linear chain of qubits and a plurality of matchgates arranged in layers. Each matchgate is configured to perform a two-qubit rotation on neighboring qubits within the linear chain. An initial state is provided for each qubit in the linear chain, The quantum circuit is applied to the initial values, thereby preparing an ansastz on the linear chain of qubits, the ansatz corresponding to a fermionic state.

35 Claims, 19 Drawing Sheets

(56) References Cited

OTHER PUBLICATIONS

Dallaire-Demers et al., "Low-depth circuit ansatz for preparing correlated fermionic states on a quantum computer," APS Physics, 63(1): 1-15 (2018).
International Preliminary Report on Patentability for International Application No. PCT/US2018/067093 dated Jun. 23, 2020.
International Search Report and Written Opinion for International Application No. PCT/US2018/067093 dated Apr. 30, 2019.
Kivlichan et al., "Quantum Simulation of Electronic Structure with Linear Depth and Connectivity," Physical Review Letters, 120: 110501 (2018).
Nest., "Quantum matchgate computations and linear threshold gates," Proceedings of the Royal Society A, 467: 821-840 (2011).
Romero et al., "Strategies for quantum computing molecular energies using the unitary coupled cluster ansatz," Quantum Science and Technology, 4: 14008 (2018).

* cited by examiner

PREPARING CORRELATED FERMIONIC STATES ON A QUANTUM COMPUTER

CROSS-REFERENCE TO RELATED APPLICATIONS

This application is the U.S. National Stage of International Application No. PCT/US18/67093, filed Dec. 21, 2018, which designates the U.S., published in English, and claims the benefit of U.S. Provisional Application No. 62/608,972, filed on Dec. 21, 2017. The entire teachings of the above applications are incorporated herein by reference.

This invention was made with Government support under Grant No. FA9550-12-1-0046 awarded by the Air Force Office of Scientific Research. The Government has certain rights to this invention.

BACKGROUND

Embodiments of the present disclosure relate to a universal quantum simulator, and more specifically, to preparing correlated fermionic states on a quantum computer for determining a ground state of a correlated fermionic system.

BRIEF SUMMARY

According to embodiments of the present disclosure, methods of and computer program products for configuring a quantum circuit to determine a ground state of a correlated fermionic system are provided. In various embodiments, the quantum circuit comprises a linear chain of qubits and a plurality of matchgates arranged in layers. Each matchgate is configured to perform a two-qubit rotation on neighboring qubits within the linear chain. In various embodiments, the method comprises providing an initial state for each qubit in the linear chain and applying the quantum circuit to the initial values, thereby preparing an ansatz on the linear chain of qubits, the ansatz corresponding to a fermionic state. In some embodiments, the fermionic state is Gaussian.

In some embodiments, the quantum circuit further comprises a plurality of two-qubit gates arranged in layers. The layers are arranged in series to form a block. Each gate is configured to perform a two-qubit rotation on neighboring qubits within the linear chain. The rotation comprises a ZZ rotation. In some such embodiments, the fermionic state is non-Gaussian. In some embodiments, the quantum circuit comprises at least two blocks.

In some embodiments, the linear chain of qubits comprises eight qubits. In some embodiments, the quantum circuit comprises a first number of qubits in the linear chain, and a second number of layers of matchgates, and the second number is less than or equal to half the first number. In some embodiments, the quantum circuit comprises a first number of qubits in the linear chain, and a second number of layers in the block, and the second number is less than or equal to half the first number.

In some embodiments, the initial state correspond to a quasiparticle vacuum state. In some embodiments, the quantum circuit further comprises gates configured to perform a rotation on each qubit of the linear chain in advance of the block.

In some embodiments, the plurality of matchgates is arranged in two sequential groups, the matchgates of each group being applied in parallel. In some embodiments, the plurality of two-qubit gates is arranged in two sequential groups, the gate of each group being applied in parallel.

According to embodiments of the present disclosure, a quantum circuit for determining a ground state of a correlated fermionic system is provided. In various embodiments, the quantum circuit comprises a linear chain of qubits and a plurality of matchgates arranged in layers. Each matchgate is configured to perform a two-qubit rotation on neighboring qubits within the linear chain.

In some embodiment, the quantum circuit comprises a plurality of two-qubit gates arranged in layers. The layers are arranged in series to form a block. Each gate is configured to perform a two-qubit rotation on neighboring qubits within the linear chain. The rotation comprises a ZZ rotation. In some such embodiments, the quantum circuit comprises at least two blocks.

In some embodiments, the linear chain of qubits comprises eight qubits. In some embodiments, the quantum circuit comprises a first number of qubits in the linear chain, and a second number of layers of matchgates, and the second number is less than or equal to half the first number. In some embodiments, the quantum circuit comprises a first number of qubits in the linear chain, and a second number of layers in the block, and wherein the second number is less than or equal to half the first number.

In some embodiments, the quantum circuit further comprises gates configured to perform a rotation on each qubit of the linear chain in advance of the block.

In some embodiments, the plurality of matchgates is arranged in two sequential groups, the matchgates of each group being applied in parallel. In some embodiments, the plurality of two-qubit gates is arranged in two sequential groups, the gate of each group being applied in parallel.

According to embodiments of the present disclosure, methods of and computer program products for determining a ground state of a correlated fermionic system. In various embodiments, a quantum circuit has a plurality of configuration parameters. The quantum circuit comprises a linear chain of qubits and a plurality of matchgates arranged in layers. Each matchgate is configured to perform a two-qubit rotation on neighboring qubits within the linear chain. An initial state is provided for each qubit in the linear chain. The quantum circuit is applied to the initial values, thereby preparing an ansatz on the linear chain of qubits. The ansatz corresponds to a fermionic state. The quantum circuit is used to determine a first energy value of the correlated fermionic system. Based on the first energy value, the plurality of configuration parameters are adjusted. The quantum circuit is used to determine a second energy value of the correlated fermionic system. The configuration parameters are adjusted to minimize the second energy value.

In some embodiments, adjusting a plurality of configuration parameters comprises optimizing the plurality of configuration parameters using a classical computing node. In some embodiments, the first energy value is a function of the configuration parameters. The function has a gradient. The method further comprises determining the gradient.

In some embodiments, the fermionic state is Gaussian.

In some embodiments, the quantum circuit further comprises a plurality of two-qubit gates arranged in layers. The layers are arranged in series to form a block. Each gate is configured to perform a two-qubit rotation on neighboring qubits within the linear chain. The rotation comprises a ZZ rotation. In some such embodiments, the fermionic state is non-Gaussian.

In some embodiments, the quantum circuit comprises at least two blocks. In some embodiments, the linear chain of qubits comprises eight qubits.

In some embodiments, the quantum circuit comprises a first number of qubits in the linear chain, and a second number of layers of matchgates, and the second number is less than or equal to half the first number. In some embodiments, the quantum circuit comprises a first number of qubits in the linear chain, and a second number of layers in the block, and the second number is less than or equal to half the first number.

In some embodiments, the initial state correspond to a quasiparticle vacuum state.

In some embodiments, the quantum circuit further comprises gates configured to perform a rotation on each qubit of the linear chain in advance of the block.

In some embodiments, the plurality of matchgates is arranged in two sequential groups, the matchgates of each group being applied in parallel. In some embodiments, the plurality of two-qubit gates is arranged in two sequential groups, the gate of each group being applied in parallel.

DETAILED DESCRIPTION

Figure 1A:
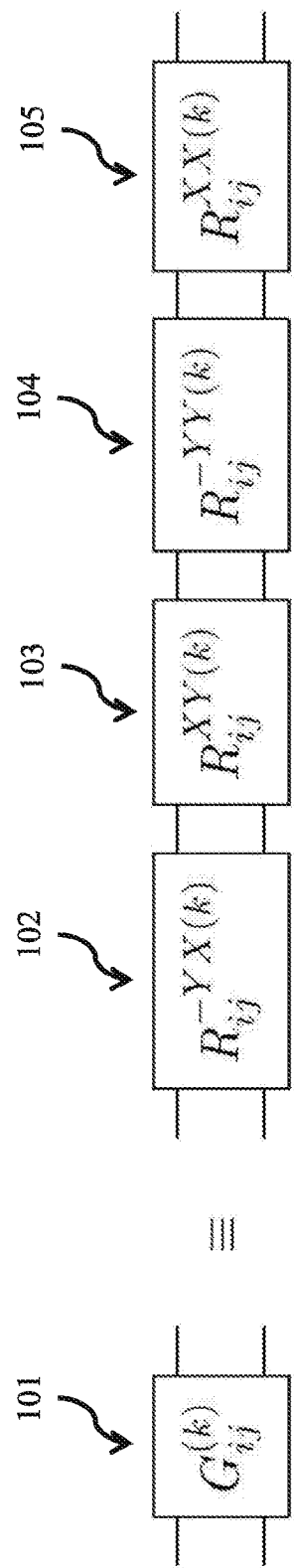
FIGS. 1A-D are schematic diagrams of a quantum circuit according to embodiments of the present disclosure.
Figure 1B:
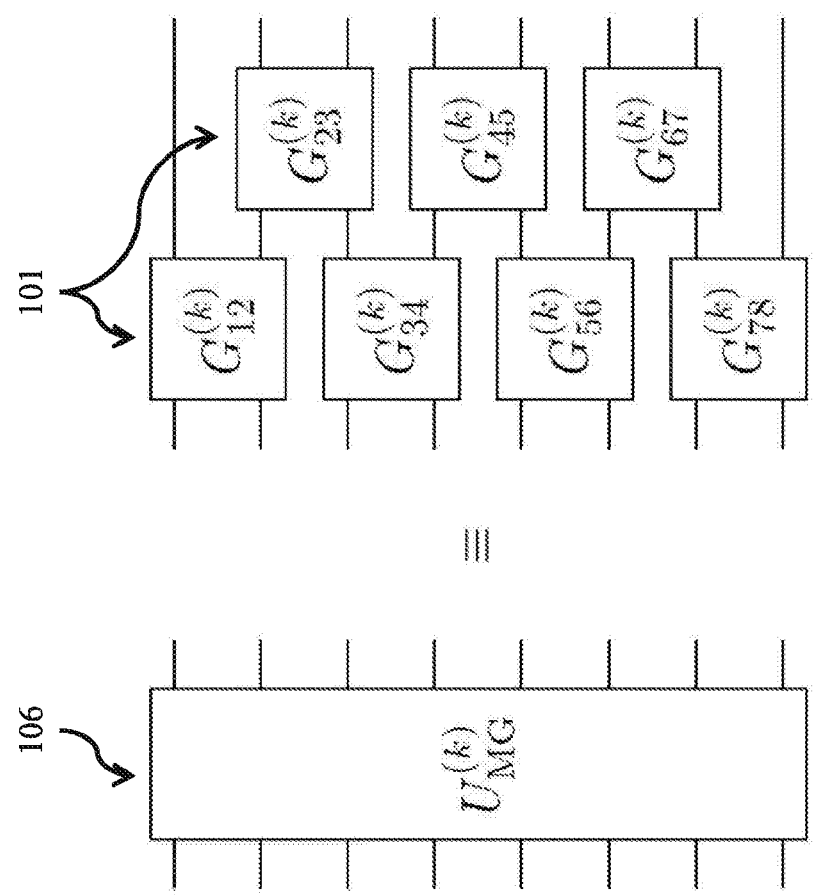

A quantum simulator is a quantum computer that permits the study of quantum systems that are difficult to study in the laboratory and computationally impossible to model with a classical computer. A quantum system of many particles is described by a Hilbert space whose dimension is exponentially large in the number of particles. Accordingly, simulation of such a system requires exponential time on a classical computer. However, a quantum system of many particles may be simulated by a quantum computer using a number of quantum bits on the order of the number of particles in the original system. Quantum simulators may be implemented in a variety of underlying quantum computer platforms, including systems of ultracold quantum gases, trapped ions, photonic systems, and superconducting circuits.

At a high level, quantum simulation is directed to computing a lowest energy state of a Hamiltonian. A Hamiltonian is a quantum mechanical energy operator that describes the interactions between particles such as electrons and nuclei. The lowest energy state of the molecular Hamiltonian dictates the structure of the molecule and how it will interact with other molecules. A quantum circuit is prepared with a trial ground state of the Hamiltonian. Measurements are performed to evaluate the energy of the prepared trial state. The measured energy values are fed to a classical optimization routine that generates the next quantum circuit to drive the quantum processor to, in order to further reduce the energy. Iterations are performed until the lowest energy is obtained to the desired accuracy.

The macroscopic properties of matter emerge from its microscopic quantum constituents, whose massive components are mostly fermions. Understanding and modelling the behavior of a large number of interacting fermions is a central and fundamental problem in physics and chemistry. Addressing fermionic modelling requires a prohibitive investment in computational resources, as the memory required to represent a many-body state scales exponentially with the number of particles. Accordingly, a quantum computer provides a substantial improvement to simulation of quantum systems. Quantum simulation is useful in the design of new molecules such as drugs, fertilizers, and catalysts. Similarly, it is useful in design of superconducting and topological materials.

Variational quantum eigensolvers (VQE) are class of quantum algorithms designed to prepare states for quantum simulations and measure the desired observables. However, VQEs on contemporary quantum computers suffer from limited coherence as a consequence of noise and finite experimental precision. Accordingly, low-depth circuits for quantum simulations and state preparation are desirable. VQE provides a resource-efficient approach that may employ unitary coupled cluster as the ansatz to approximate ground states of many-body fermionic Hamiltonians. However, the initial state of the VQE procedure is a single reference product state with no entanglement extracted from a classical Hartree-Fock calculation.

In general, a Gaussian state may be a coherent state (such as the state of light pulses from a traditional Laser) or a squeezed vacuum state of one mode or two modes. More specifically, a state is Gaussian if it has a representation in terms of Gaussian functions, e.g., a distribution function in phase space or its density operator in Fock space in Gaussian form.

Variational quantum algorithms involve a parameterized procedure (usually a parameterized quantum circuit) for preparing quantum states (the variational ansatz). The variational ansatz is iteratively improved by measuring an objective function and then using a classical optimization routine to suggest new parameters. Usually, the measurement objective is the expectation value of the energy on the current quantum state. In general, in a variational algorithms, one prepares an ansatz $|\psi(\theta)\rangle$ for the ground state that is described in terms of parameters θ selected to minimize the expectation value of the Hamiltonian. The ansatz may be prepared by applying a parameterized quantum circuit to a suitable reference state. The reference state may be chosen to be the mean-field solution to a problem.

The present disclosure enables initializing the algorithm with a more general fermionic Gaussian state. This Gaussian reference state can be prepared with a linear-depth circuit of quantum matchgates. By augmenting the set of available gates with nearest-neighbor phase coupling, a low-depth circuit ansatz is provided that can accurately prepare the ground state of correlated fermionic systems. This extends the range of applicability of the VQE to systems with strong pairing correlations such as superconductors, atomic nuclei, and topological materials.

The present disclosure provides for a new type of low-depth VQE ansatz that can be used to prepare the ground state of correlated fermions with pairing interactions by systematically appending variational cycles composed of linear-depth blocks of 2-qubit gates.

Below, the formulation of the strong correlation problem for fermions is described in the context of second quantization. The unitary version of Bogoliubov coupled cluster theory is presented. How to computed the generalized Hartree-Fock (GHF) reference state as a fermionic Gaussian state is described. How to exactly prepare pure fermionic Gaussian states on a quantum computer using a linear-depth circuit is described. A low-depth circuit ansatz (LDCA), consisting of matchgates circuit plus additional nearest-neighbor phase coupling is described. Numerical benchmarks are provided for the LCDA ansatz for the prototypical examples of the Fermi-Hubbard model in condensed matter and the automerization reaction of cyclobutadiene in quantum chemistry, showing the potential to describe the exact ground state of strongly correlated systems.

As used herein, a quantum gate (or quantum logic gate) is a basic quantum circuit operating on a small number of qubits. By analogy to classical computing, quantum gates form quantum circuits, like classical logic gates form conventional digital circuits. Quantum logic gates are represented by unitary matrices. Various common quantum gates operate on spaces of one or two qubits, like classical logic gates operate on one or two bits. As matrices, quantum gates can be described by $2^n \times 2^n$ sized unitary matrices, where n is the number of qubits. The variables that the gates act upon, the quantum states, are vectors in $2^n$ complex dimensions. The base vectors indicate the possible outcomes if measured, and a quantum state is a linear combinations of these outcomes. The action of the gate on a specific quantum state is found by multiplying the vector which represents the state by the matrix representing the gate.

As noted above, gates can operate on any number of qubits, although one-qubit gates and two-qubit gates are common. Examples of one-qubit gates include the Pauli X, Y, and Z gates, which act on a single qubit and correspond to a rotation around the X, Y, or Z axis of the Bloch sphere of the qubit. One example of a two-qubit gate is a matchgate, which is defined by the 4×4 matrix of Equation 24. It will be appreciated that additional two-qubit gates may be defined by 4×4 unitary matrices, or in terms of their constituent rotations.

Various physical embodiments of a quantum computer are suitable for use according to the present disclosure. In general, the fundamental data storage unit in quantum computing is the quantum bit, or qubit. The qubit is a quantum-computing analog of a classical digital-computer-system bit. A classical bit is considered to occupy, at any given point in time, one of two possible states corresponding to the binary digits 0 or 1. By contrast, a qubit is implemented in hardware by a physical component with quantum-mechanical characteristics. Each unit has an infinite number of different potential quantum-mechanical states. When the state of a qubit is physically measured, the measurement produces one of two different basis states. Thus, a single qubit can represent a one, a zero, or any quantum superposition of those two qubit states; a pair of qubits can be in any quantum superposition of 4 states; and three qubits in any superposition of 8 states. While qubits are characterized herein as mathematical objects, each corresponds to a physical qubit that can be implemented using a number of different physical implementations, such as trapped ions, optical cavities, individual elementary particles, molecules, or aggregations of molecules that exhibit qubit behavior.

In contrast to classical gates, there are an infinite number of possible single-qubit quantum gates that change the state vector of a qubit. Changing the state of a qubit state vector is therefore referred to as a rotation. A rotation, state change, or single-qubit quantum-gate operation may be represented mathematically by a unitary 2×2 matrix with complex elements. A rotation corresponds to a rotation of a qubit within Hilbert space, which may be conceptualized as rotation of the Bloch sphere.

A quantum circuit can be specified as a sequence of quantum gates. To conceptualize a quantum circuit, the matrices corresponding to the component quantum gates may be multiplied together in the order specified by the symbol sequence to produce a $2^n \times 2^n$ complex matrix representing the same overall state change on n qubits. A quantum circuit may thus be expressed as a single resultant operator. However, designing a quantum circuit in terms of constituent gates allows the design to conform to standard sets of gates, and thus enable greater ease of deployment. A quantum circuit thus corresponds to a design for a physical circuit in a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

Provided herein is a definition of the ground state of fermionic Hamiltonians as found in quantum chemistry, condensed matter, and nuclear physics. A Bogoliubov unitary coupled cluster (BUCC) theory is provided as a variational ansatz to the ground state problem. A formalism of the generalized Hartree-Fock (GHF) theory is provided as a starting point of the BUCC optimization method. A GHF is prepared on a quantum processor using matchgates and a low-depth circuit ansatz (LDCA) is provided that can be used to prepare the ground state of fermionic Hamiltonian with high accuracy.

Many systems in quantum chemistry, condensed matter and nuclear structure physics can be modelled by an ensemble of interacting fermions (e.g., electrons, nucleons) described by a second quantized Hamiltonian of the form of Equation 1.

$$H = \sum_{pq}(t_{pq}a_p^\dagger a_q + \Delta_{pq}a_p^\dagger a_q^\dagger + \Delta_{pq}^* a_q a_p) + \sum_{pqrs}v_{pqrs}a_p^\dagger a_q^\dagger a_s a_r + \sum_{pqrstu}v_{pqrstu}w_{pqrstu}a_p^\dagger a_q^\dagger a_r^\dagger a_u a_t a_s. \qquad \text{Equation 1}$$

In general, the p, q, . . . , u indices run over all relevant quantum numbers (e.g., position, momentum, band number, spin, angular momentum, isospin, etc.) which dene M fermionic modes. The fermionic mode operators follow canonical anti-commutation relations $\{a_k, a_l^\dagger\} = \delta_{kl}$ and $\{a_k, a_l\} = \{a_k^\dagger, a_l^\dagger\} = 0$. The kinetic energy terms $t_{pq}$ and the interaction $v_{pqrs}$ are ubiquitous in most theories, while pairing terms $\Delta_{pq}$ often appear in the context of mean-field superconductivity and the three-body interaction term $w_{pqrstu}$ can be phenomenologically introduced in nuclear physics.

As a prerequisite to calculating various observable quantities, we are interested in finding the ground state $\rho_0 = |\psi_0\rangle\langle\psi_0|$ of the Hamiltonian (Equation 1) such that the energy E is minimized over the set of all possible states $\rho$ in a given Hilbert space as in Equation 2.

$$\begin{aligned}E_0 &\equiv E(\rho_0) \\ &= \min_\rho E(\rho) \\ &= \min_\rho tr(H\rho)\end{aligned} \qquad \text{Equation 2}$$

When this minimization cannot be done either analytically or with numerically exact methods, we have to resort to approximate methods such as variational ansatzes. One such ansatz, the BUCC method, is described below.

Coupled cluster methods are used in ab initio quantum chemistry calculations to describe correlated many-body states with a better accuracy than the Hartree-Fock method. Bogoliubov- and quasiparticle-based coupled cluster methods extend the range of applicability of those methods to systems with mean-field paired states. A formalism for the unitary version of the Bogoliubov coupled cluster theory is provided herein.

The most general linear transformation acting on fermionic creation and annihilation operators that preserves the canonical anti-commutation relation is the Bogoliubov transformation. In this transformation, the quasiparticle operators $(\beta_p^\dagger; \beta_p)$ are related to the single-particle operators $(\alpha_p^\dagger; a_p)$ by a unitary matrix as in Equation 3.

$$\beta_{p'}^\dagger = \Sigma_p(U_{pp'}a_p^\dagger + V_{pp'}a_p)$$

$$\beta_{p'} = \Sigma_p(U_{pp'}^* a_p + V_{pp'}^* a_p^\dagger) \quad \text{Equation 3}$$

This transformation preserves the canonical anti-commutation relation such that $\{\beta_k, \beta_l^\dagger\} = \delta_{kl}$ and $\{\beta_k, \beta_l\} = \{\beta_k^\dagger, \beta_l^\dagger\} = 0$. By introducing the vector notation $\vec{a}^\intercal = (a_1, \ldots, a_M, a_1^\dagger, \ldots, a_M^\dagger)$ and $\vec{\beta}^\intercal = (\beta_1, \ldots, \beta_M, \beta_1^\dagger, \ldots, \beta_M^\dagger)$, Equation 3 may be expressed in matrix notation as $\vec{\beta} = \mathcal{U} \vec{a}$ where the Bogoliubov transformation is unitary $\mathcal{U}^{-1} = \mathcal{U}^\dagger$ and its matrix is defined as in Equation 4.

$$u = \begin{pmatrix} U^* & V^* \\ V & U \end{pmatrix} \quad \text{Equation 4}$$

The ground state of a quadratic Hamiltonian (all $v_{pqrs} = 0$ and $w_{pqrstu} = 0$) is a product state as in Equation 5 where $|\text{vac}\rangle$ is the Fock vacuum and C is a normalization factor. If the ground state is not degenerate, Equation 5 acts as a quasiparticle vacuum $\beta_j |\Phi_0\rangle = 0$.

$$|\Phi_0\rangle = C \prod_{k=1}^{\text{rank}(V)} \beta_k |\text{vac}\rangle \quad \text{Equation 5}$$

We can define the quasiparticle cluster operator $\mathcal{T} = \mathcal{T}_1 + \mathcal{T}_2 + \mathcal{T}_3 + \ldots$ where $\mathcal{T}_n$ are deined as in Equation 6.

$$\mathcal{T}_1 = \Sigma_{k_1 k_2} \theta_{k_1 k_2} \beta_{k_1}^\dagger \beta_{k_2}^\dagger$$

$$\mathcal{T}_2 = \Sigma_{k_1 k_2 k_3 k_4} \theta_{k_1 k_2 k_3 k_4} \beta_{k_1}^\dagger \beta_{k_2}^\dagger \beta_{k_3}^\dagger \beta_{k_4}^\dagger$$

$$\mathcal{T}_3 = \Sigma_{k_1 k_2 k_3 k_4 k_5 k_6} \theta_{k_1 k_2 k_3 k_4 k_5 k_6} \beta_{k_1}^\dagger \beta_{k_2}^\dagger \beta_{k_3}^\dagger \beta_{k_4}^\dagger \beta_{k_5}^\dagger \beta_{k_6}^\dagger. \quad \text{Equation 6}$$

The $\theta_{k_1 k_2 \ldots} \in \mathbb{C}$ are variational parameters which are fully antisymmetric such that $\theta_{k_1 k_2 \ldots} = (-1)^{\xi(P)} \theta_{P(k_1 k_2 \ldots)}$, where $\xi(P)$ is the signature of the permutation P. The BUCC ansatz is defined as in Equation 7 where $\Theta$ corresponds to the set of variational parameters $\theta_{k_1 k_2 \ldots}$ and $|\Phi_0\rangle$ is a reference state. Since the transformation is unitary $|\langle \Psi(\Theta)|\Psi(\Theta)\rangle| = 1$, $|\Psi(\Theta)\rangle$ is always normalized. The BUCC ansatz is said to be over single (BUCCS) or double excitations (BUCCSD) if the cluster operator $\mathcal{T}$ is truncated at the first or second order.

$$|\Psi(\Theta)\rangle = e^{i(\mathcal{T}(\Theta) + \mathcal{T}^\dagger(\Theta))} |\Phi_0\rangle \quad \text{Equation 7}$$

To variationally optimize the BUCC ansatz, we aim to find the angles $\Theta$ that minimize the energy as in Equation 8 subject to the constraint that the number of particles as in Equation 9 should be kept constant, as the quasiparticles operators do not preserve the total particle number in general. As set forth below, a method is provided to compute the reference state from the generalized Hartree-Fock theory along with the details of the implementation of the quantum algorithm.

$$\min_\Theta E(\Theta) = \langle \Psi(\Theta)|H|\Psi(\Theta)\rangle \quad \text{Equation 8}$$

$$\langle N(\Theta) \rangle = \langle \Psi(\Theta)|N|\Psi(\Theta)\rangle \quad \text{Equation 9}$$

$$= \sum_{p=1}^{M} \langle \Psi(\Theta)|a_p^\dagger a_p|\Psi(\Theta)\rangle$$

As set forth below, the Bogoliubov matrix (Equation 4) may be obtained and used to define the reference state (Equation 5). In various embodiments, the method relies on the theory of fermionic Gaussian states, which is described below. A method is provided to obtain the covariance matrix of the ground state without a self-consistent loop. Fermionic Gaussian states are a useful starting point for quantum simulations as they include the family of Slater determinants from Hartree-Fock theory and Bardeen-Cooper-Schrieer (BCS) states found in the mean-field theory of superconductivity and can be prepared on a quantum computer.

For M fermionic modes, it is convenient to define the 2M Majorana operators as in Equation 10 as the fermionic analogues of position and momentum operators.

$$\gamma_j = \gamma_j^A = a_j^\dagger + a_j$$

$$\gamma_{j+M} = \gamma_j^B = -i(a_j^\dagger - a_j) \quad \text{Equation 10}$$

The extended index notation (from 1 to 2M) or the A, B superscript notation are used interchangeably herein for clarity of the equations. Their commutation relations satisfy $\{\gamma_k, \gamma_l\} = 2\delta_{kl}$ such that $\gamma_k^2 = 1$. It is useful to define the vector notation $\vec{\gamma} = (\gamma_1, \ldots, \gamma_M, \gamma_{M+1}, \ldots, \gamma_{2M})$ and write $\vec{\gamma} = \Omega \vec{a}$ according to Equation 11.

$$\Omega = \begin{pmatrix} 1 & 1 \\ i1 & -i1 \end{pmatrix} \quad \text{Equation 11}$$

In this case, 1 is the M×M identity matrix. A general fermionic Gaussian state has the form of the exponential of a quadratic product of fermionic operators as in Equation 12 where Z is the normalization factor and G is a real and antisymmetric matrix such that $G^{-1} = -G$.

$$\rho = \frac{1}{Z} e^{-\frac{i}{4} \vec{\gamma}^T G \vec{\gamma}} \quad \text{Equation 12}$$

It can be fully characterized by a real and antisymmetric covariance matrix which is defined by Equation 13 where $[\bullet, \bullet]$ is the commutator. For a pure Gaussian state, $\Gamma^2 = -1$, where 1 is the 2M×2M identity matrix.

$$\Gamma_{kl} = \frac{i}{2} \text{tr}(\rho[\gamma_k, \gamma_l]) \quad \text{Equation 13}$$

In general, the purity is given by $$\chi = -\frac{1}{2M} tr(\Gamma^2).$$

In order to extract $\mathcal{U}$ given a covariance matrix $\Gamma$, we make use of the complex covariance matrix representation as in Equation 14 where $Q_{kl}=\frac{1}{2}\langle [a_k, a_l]\rangle$ and $R_{kl}=\frac{1}{2}\langle [a_k, a_l^\dagger]\rangle$ (expectation values are defined and $\langle O \rangle = tr(\check{O}\rho)$).

$$\Gamma_c = \frac{1}{4}\Omega^\dagger \Gamma \Omega^* = \begin{pmatrix} Q & R \\ R^* & Q^* \end{pmatrix} \quad \text{Equation 14}$$

From there, we can define the single-particle density operators $\kappa \equiv -iQ$ and $Q \equiv \frac{1}{2} 1 - iR^\perp$ and recast the Gaussian state in the form of a single-particle density matrix as in Equation 15 such that $M^2 = M$ for pure states.

$$\mathcal{M} = \begin{pmatrix} \varrho & \kappa^\dagger \\ \kappa & 1-\varrho^\top \end{pmatrix} \quad \text{Equation 15}$$

If we define the matrix $$\varepsilon = \begin{pmatrix} 0 & 0 \\ 0 & 1 \end{pmatrix},$$

then it is possible to find the Bogoliubov transformation (Equation 4) with the eigenvalue equation as in Equation 16.

$$\mathcal{M}\mathcal{U}^\dagger = \varepsilon \mathcal{U}^\dagger \quad \text{Equation 16}$$

A set forth below, the covariance matrix (Equation 13) can be computed, approximating the ground state of the Hamiltonian (Equation 1). In particular, steps described below are aimed at calculating the covariance matrix approximating the ground state of an interacting Hamiltonian without a self-consistent loop.

The Hamiltonian (Equation 1) can be rewritten with Majorana operators in the form of Equation 17 where $T^\perp = -T$ and V and W are anti symmetric under the exchange of any two adjacent indices.

$$H = \Sigma_{pq} T_{pq} \gamma_p \gamma_q + \Sigma_{pqrs} V_{pqrs} \gamma_p \gamma_q \gamma_s \gamma_r +$$
$$i\Sigma_{pqrs} W_{pqrstu} \gamma_p \gamma_q \gamma_r \gamma_u \gamma_t \gamma_s. \quad \text{Equation 17}$$

Expectation values over Gaussian states can be efficiently calculated using Wick's theorem which has the form of Equation 18 where $1 \leq j_1 < \ldots < j_{2p} \leq 2M$, $\Gamma|_{j_1 \ldots j_{2p}}$ is the corresponding submatrix of $\Gamma$ and Equation 19 is the Pfaffian of a $2M \times 2M$ matrix defined from the symmetric group $S_{2M}$ where sgn(s) is the signature of the permutation s.

$$i^p tr\left(\rho \gamma_{j_1} \ldots \gamma_{j_{2p}}\right) = Pf(\Gamma|_{j_1 \ldots j_{2p}}) \quad \text{Equation 18}$$

$$Pf(\Gamma) = \frac{1}{2^M M!} \sum_{s \in S_{2M}} \text{sgn}(s) \prod_{j=1}^{M} \Gamma_{s(2j-1), s(2j)} \quad \text{Equation 19}$$
$$= \sqrt{\det(\Gamma)}$$

Assuming that Wick's theorem holds, we can write an effective but state dependent quadratic Hamiltonian as in Equation 20 where $$tr_B(V\Gamma)_{ij} = \sum_{kl} V_{ijkl} \Gamma_{lk} \text{ and } tr_C(W\Gamma\Gamma)_{ij} = \sum_{klmn} W_{ijklmn} \Gamma_{kn} \Gamma_{ml}. \quad \text{Equation 20}$$

$$h(\Gamma) = T + 6tr_B(V\Gamma) + 45tr_C(W\Gamma\Gamma)$$

To get the covariance matrix of the reference state, we use the imaginary time evolution starting from a pure state $\Gamma(0)^2 = -1$ as in Equation 21 where the orthogonal time evolution operator is given by Equation 22 with $\mathbb{T}$ being the time ordering.

$$\Gamma(\tau) = O(\tau)\Gamma(0)O(\tau)^\perp \quad \text{Equation 21}$$

$$O(\tau) = \mathbb{T} \, e^{2\int_0^\tau d\tau' [h(\Gamma(\tau')), \Gamma(\tau')]}. \quad \text{Equation 22}$$

The steady state is reached when $[h(\Gamma), \Gamma] = 0$. This is guaranteed to lower the energy of an initial state and keep the purity of the initial $\Gamma(0)$, but the imaginary time evolution may get stuck in a local minimum. A second complementary approach consists in minimizing the free energy of Equation 17. The procedure involves fixed point iterations on the transcendental equation as in Equation 23.

$$\Gamma = \lim_{\beta \to \infty} \tanh[2i\beta h(\Gamma)] \quad \text{Equation 23}$$

As set forth in the numerical examples below, an imaginary time evolution (Equation 21) followed by a fixed point evolution (Equation 23) is numerically stable and consistently reaches the desired GI-1F ground state. As set forth below, matchgates can be used to prepare a pure Gaussian state on a quantum computer as a reference state for a variational procedure.

As set forth above, quantum computers may enable the simulation of quantum systems beyond the reach of classical computers. Practical simulation requires preparation of the ground state of interesting Hamiltonians with high accuracy. The VQE protocol may be applied to reach this ground state. However, general implementations of VQE trade long circuit depth for accuracy in a non-controllable manner.

As described herein, a composable VQE ansatz is provided that is both accurate and hardware-efficient with the added advantage of being able to represent states with Bardeen-Cooper-Schrieer (BCS)-like pairing correlations. Various methods described herein rely on matchgates and their relation to fermionic linear optics in order to prepare a reference Gaussian state and parametrize an ansatz with a transformation analogous to fermionic non-linear optics. A given pure Gaussian state can be prepared on a quantum register with a linear-depth algorithm. Accordingly, the present disclosure provides a low-depth circuit ansatz with inherited properties of the BUCC ansatz and the apparent accuracy of the full configuration interaction method.

In the computational basis of a 2-qubit Hilbert space, matchgates have the general form as in Equation 24 where $$A = \begin{pmatrix} p & q \\ r & s \end{pmatrix} \text{ and } B = \begin{pmatrix} w & x \\ y & z \end{pmatrix}$$

are SU(2) matrices with the same determinant detA=detB.

$$\mathcal{G}(A, B) = \begin{pmatrix} p & 0 & 0 & q \\ 0 & w & x & 0 \\ 0 & y & z & 0 \\ r & 0 & 0 & s \end{pmatrix} \quad \text{Equation 24}$$

They form a group that is generated by the tensor product of nearest-neighbor Pauli operators as in Equation 25, which also correspond to the Jordan-Wigner transformed product of all products of nearest-neighbor Majorana operators. This establishes the connection with fermionic Gaussian operations.

$$\sigma_x^j \otimes \sigma_x^{j+1} = -i\gamma_j^B \gamma_{j+1}^A$$

$$\sigma_x^j \otimes \sigma_y^{j+1} = -i\gamma_j^B \gamma_{j+1}^B$$

$$\sigma_y^j \otimes \sigma_x^{j+1} = -i\gamma_j^A \gamma_{j+1}^A$$

$$\sigma_y^j \otimes \sigma_y^{j+1} = -i\gamma_j^A \gamma_{j+1}^B$$

$$\sigma_z^j \otimes \mathbb{I}^{j+1} = -i\gamma_j^A \gamma_j^B$$

$$\mathbb{I}^j \otimes \sigma_z^{j+1} = -i\gamma_{j+1}^A \gamma_{j+1}^B \qquad \text{Equation 25}$$

The Bogoliubov transformation (Equation 3) can be written as an SO(2M) transformation of the Majorana operators (Equation 10) as $\tilde{\gamma} = \mathcal{R}\gamma$ where $\mathcal{R}$ is as in Equation 26.

$$\mathcal{R} = \begin{pmatrix} \text{Re}(U+V) & -\text{Im}(U-V) \\ \text{Im}(U+V) & \text{Re}(U-V) \end{pmatrix} \qquad \text{Equation 26}$$

To implement this transformation on a quantum processor, there exists a quantum circuit of nearest-neighbor matchgates $U_{Bog}$ acting on M qubits such that Equation 27 holds.

$$U_{Bog} \gamma_j U_{Bog}^\dagger = \sum_{k=1}^{2M} \mathcal{R}_{kj} \gamma_k \qquad \text{Equation 27}$$

An example of such a circuit is the fermionic fast Fourier transform. In general, the Hoffman algorithm can be used to decompose $U_{Bog}$ in 2M(M−1)SO(4) rotations between pairs of modes and MSO(2) local phases. In total, these $2M^2-M$ angles correspond to the same number of quantum gates. Using the fact that quantum gates can be operated in parallel in a linear chain of qubits, any transformation R can be implemented in circuit depth $$8\left\lceil \frac{M}{2} \right\rceil + 1,$$

as detailed in FIG. 1. As used herein, a linear chain of qubits refers to a set of qubits such that each qubit is adjacent to one or two qubits of the set. Qubits at the end of the chain have one nearest neighbor within the chain, while qubits not at the end have exactly two immediate neighbors. Thus, neighboring qubits have no other intervening qubits in the chain.

Referring to FIG. 1, an exemplary quantum circuit implementing $U_{Bog}$ is illustrated according to embodiments of the present disclosure. This example operates on 8 qubits of the decomposition of $U_{Bog}$ in a circuit of local phase rotations and nearest-neighbor matchgates. Referring to FIG. 1A, a given circuit $G_{ij}^{(k)}$ 101 is a 2-local operation between qubits i and j composed of 4 rotations $R_{ij}^{-YX(k)}$, $R_{ij}^{XY(k)}$, $R_{ij}^{-YY(k)}$, $R_{ij}^{XX(k)}$ 102 ... 105 for a layer k. Referring to FIG. 1B, unitary $U_{MG}^{(k)}$ 106 for each layer k is built by operating $G_{ij}^{(k)}$ 101 in parallel first on all even pairs of qubits (ij=12, 34, 56, 78), and then on all odd pairs (ij=23, 45, 67).

Figure 1C:
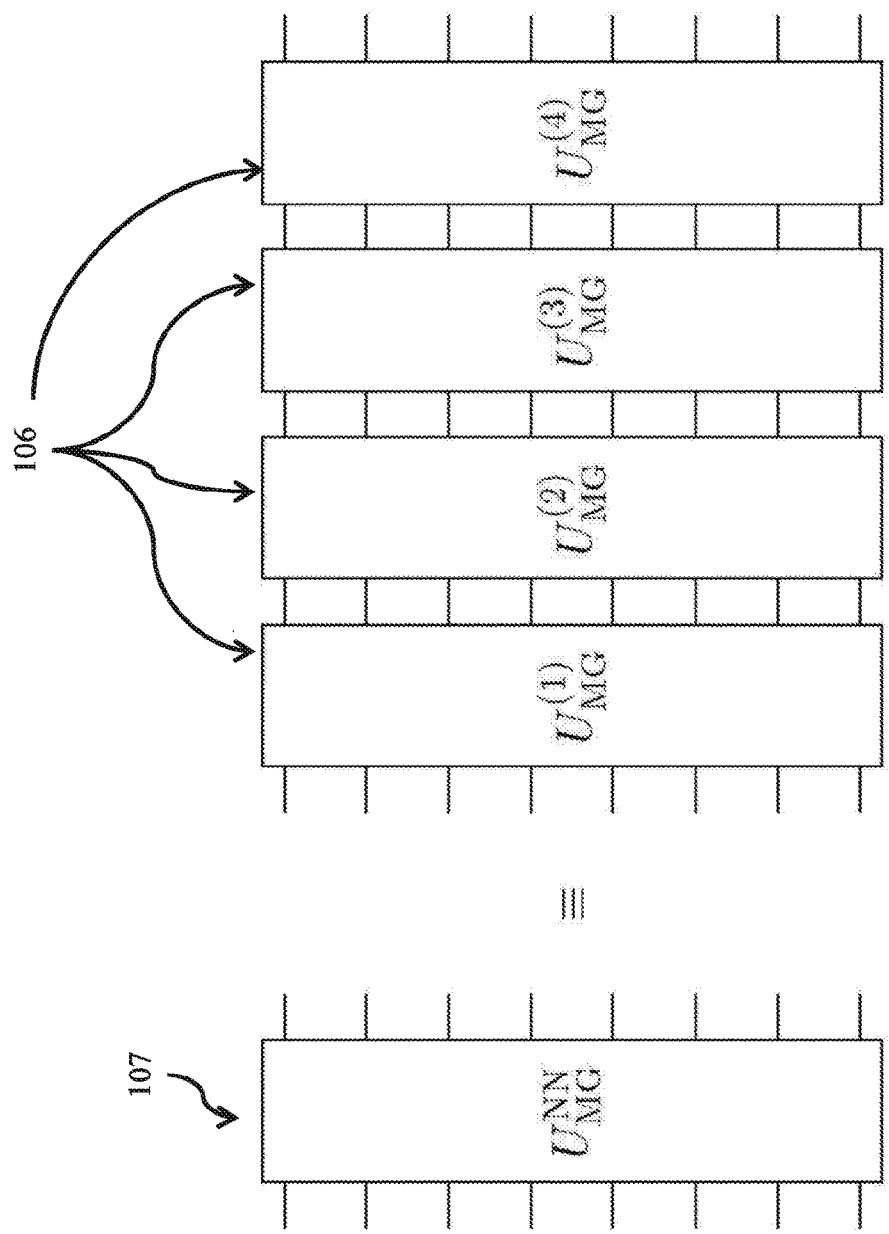
Figure 1D:
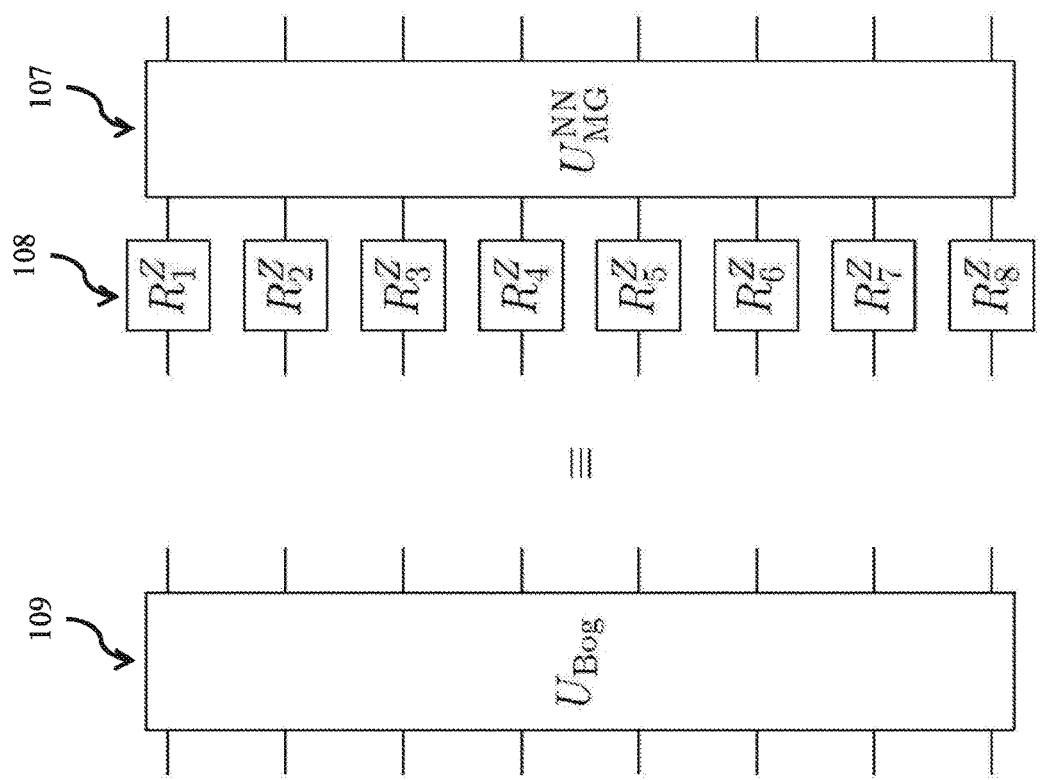

Referring to FIG. 1C, the complete sequence of nearest-neighbor matchgates $U_{MG}^{NN}$ 107 is composed of a sequence of $$k = \left\lceil \frac{M}{2} \right\rceil$$

layers of unitary $U_{MG}^{(k)}$ 106 (in this example k=4). Referring to FIG. 1D, single-qubit phase rotations $R_j^Z$ 108 (in this example, there are 8 qubits) are coupled to $U_{MG}^{NN}$ 107 to form $U_{Bog}$ circuit 109.

Since the Hoffman method assumes sequential operations on each pair of modes, we used an optimal control scheme in SO(2M) to allow an easy parametrization of gates acting in parallel. This is generally efficient on a classical computer as the matchgates only operate on a much smaller subspace of the full $SU(2^M)$ transformation allowed on M qubits. The transformation R can be decomposed in local and nearest-neighbor mode rotations such that Equation 28 holds where $\mu, \nu \in \{A,B\}$ and $j \in \{1, \ldots M\}$.

$$\mathcal{R} = \prod_{k=1}^{\left\lceil \frac{M}{2} \right\rceil} \left\{ \prod_{\mu,\nu} \prod_{j \in odd} r_{j,j+1}^{\mu\nu}(\theta_{j,j+1}^{\mu\nu(k)}) \times \prod_{\mu,\nu} \prod_{j \in even} r_{j,j+1}^{\mu\nu}(\theta_{j,j+1}^{\mu\nu(k)}) \right\} \times \prod_{j=1}^{M} r_{jj}^{AB}(\theta_{jj}^{AB}), \qquad \text{Equation 28}$$

The mode rotations are parametrized by the $2M^2-M$ angles $\theta_{ij}^{\mu\nu(k)}$ as in Equation 29 with SO(2M) Hamiltonians as in Equation 30.

$$r_{ij}^{\mu\nu} = e^{2\theta_{ij}^{\mu\nu} h_{ij}^{\mu\nu}} \qquad \text{Equation 29}$$

$$h_{ij}^{\mu\nu} = \delta_{i\mu,j\nu} - \delta_{j\nu,i\mu} \qquad \text{Equation 30}$$

The optimal control method maximizes the fidelity function of Equation 31 using the gradient as in Equation 32.

$$\Phi = \frac{1}{2M} tr\{\mathcal{R}_{target}^T \mathcal{R}(\Theta)\} \qquad \text{Equation 31}$$

$$\frac{\partial r_{ij}^{\mu\nu}}{\partial \theta_{kl}^{\alpha\beta}} = 2 h_{ij}^{\mu\nu} r_{ij}^{\mu\nu} \delta_{\alpha\mu} \delta_{\beta\nu} \delta_{ki} \delta_{lj} \qquad \text{Equation 32}$$

As shown in FIG. 1 on a 8-qubit example, this decomposition explicitly translates into a quantum circuit of single qubit phase-rotations as in Equation 33 and nearest-neighbor matchgates as in Equation 34 where each rotation as in Equation 35.

$$R_j^Z = e^{i\theta_{ii}^{AB} \sigma_z^i} \qquad \text{Equation 33}$$

$$G_{ij}^{(k)} = R_{ij}^{XX(k)} R_{ij}^{-YY(k)} R_{ij}^{XY(k)} R_{ij}^{-YX(k)} \qquad \text{Equation 34}$$

$$R_{ij}^{-YX(k)} = e^{-i\theta_{ij}^{AA(k)} \sigma_y^i \otimes \sigma_x^j} \qquad \text{Equation 35}$$

$$R_{ij}^{XY(k)} = e^{i\theta_{ij}^{BB(k)} \sigma_x^i \otimes \sigma_y^j}$$

$$R_{ij}^{-YY(k)} = e^{-i\theta_{ij}^{AB(k)} \sigma_y^i \otimes \sigma_y^j}$$

$$R_{ij}^{XX(k)} = e^{i\theta_{ij}^{BA(k)} \sigma_x^i \otimes \sigma_x^j}.$$

Each parallel cycle interleaves gates between even and odd nearest neighbors as in Equation 36 and there are $$\left\lceil \frac{M}{2} \right\rceil$$

cycles in total as in Equation 37.

$$U_{MG}^{(k)} = \prod_{i \in odd} G_{i,i+1}^{(k)} \prod_{i \in even} G_{i,i+1}^{(k)} \qquad \text{Equation 36}$$

$$U_{MG}^{NN} = \prod_{k=1}^{\left\lceil \frac{M}{2} \right\rceil} U_{MG}^{(k)} \qquad \text{Equation 37}$$

Finally, the unitary Bogoliubov transformation can be composed as in Equation 38 and is also a Gaussian operation of the form $U_{Bog} = e^{i\Sigma_{pq} \tau_{pq} \tau_p \tau_q}$, where $\tau^\perp = -\tau$.

$$U_{Bog} = U_{MG}^{NN} = \prod_{i=1}^{M} R_i^Z \qquad \text{Equation 38}$$

In the case where the reference state is a Slater determinant, only number-conserving matchgates are required to prepare the state and the depth of the circuit would scale as $$4\left\lceil \frac{M}{2} \right\rceil + 1$$

(since all $\theta_{ij}^{AA(k)}$ and $\theta_{ij}^{BB(k)}$ are set to zero). A unitary coupled cluster ansatz truncated at first order $e^{i(\mathcal{T}_1(\Theta) + \mathcal{T}_1^\dagger(\Theta))}$ is also a Gaussian transformation and can be implemented in the same way as $U_{Bog}$ with no trotterization. A VQE scheme is provided below that builds on this observation by introducing non-matchgate variational terms into a gate sequence similar to the $U_{Bog}$ decomposition.

The Bogoliubov transformation (Equation 38) acts as a change of basis of the fermionic modes. Therefore, one can follow the VQE protocol to implement the DBUCC ansatz (Equation 7) and measure the expectation values $\langle \hat{H} \rangle = \langle U_{Bog} H U_{Bog}^\dagger \rangle$ and $\langle \hat{N} \rangle = \langle U_{Bog} N U_{Bog}^\dagger \rangle$ in the modified basis to prepare an approximate ground state of (Equation 1). This has the advantage of extending the range of Hamiltonians that can be processed to those with non-number conserving terms (like pairing fields) when compared to the traditional unitary coupled cluster ansatz. However, the change of basis may significantly increase the number of terms that have to be measured. In order to reduce the number of measurements in the VQE protocol, one can start in the product state (Equation 5) and carry out the variational unitary (Equation 7) in the quasiparticle basis. An inverse Bogoliubov transformation may then be performed using matchgates, followed by measurement of the expectation values of the Hamiltonian (Equation 1) and the number operator N in the original fermionic orbital basis. In the quasiparticle basis, we can map the Bogoliubov operators to qubit operators with the Jordan-Wigner transformation since they follow the canonical anti-commutation relation as in Equation 39. The same mapping can be used for Fermionic operators $a_p^\dagger$ and $a_p$ after the Bogoliubov transformation. Assuming that the number of fermionic particles is proportional to the number of orbitals, a drawback of BUCCSD-like schemes is that the number of variational parameters will scale as $O(M^4)$. In the Jordan-Wigner picture, these terms can be implemented with $O(M^6)$ gates. It is expected that near-term quantum processor will continue to suffer from error rates that make this type of scaling impractical, and therefore more hardware efficient VQE scheme is required.

$$\beta_p^\dagger = (-1)^{p-1} \left( \bigotimes_{j=1}^{p-1} \sigma_z \right) \otimes \sigma_+ \qquad \text{Equation 39}$$

$$\beta_p = (-1)^{p-1} \left( \bigotimes_{j=1}^{p-1} \sigma_z \right) \otimes \sigma_-$$

Given that the gate decomposition of $U_{Bog}$ can also exactly parametrize a BUCCS VQE protocol in linear circuit depth, a scheme may be augmented with nearest-neighbor phase coupling $\sigma_z \otimes \sigma_z$ rotations to mimic the effects of the quartic variational terms of $\mathcal{T}_2$. In a loose sense, this scheme is a parametrized fermionic non-linear optics circuit that does not involve any trotterization of the variational terms. The algorithm is illustrated in FIG. 2.

Figure 2A:
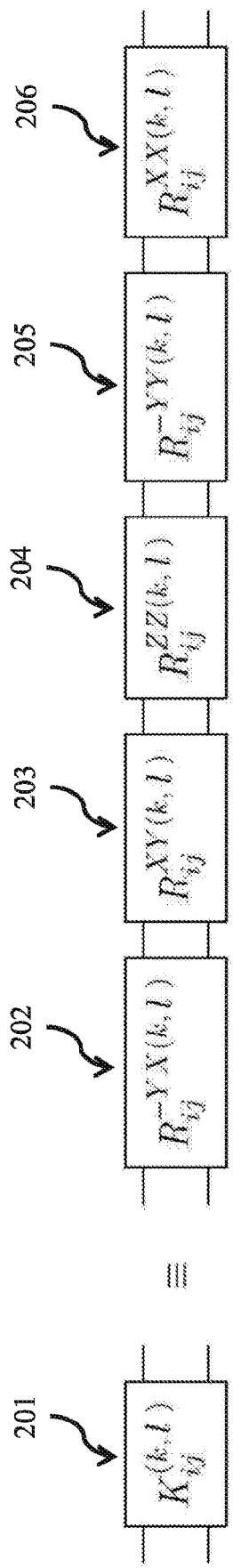
FIGS. 2A-E are schematic diagrams of a quantum circuit according to embodiments of the present disclosure.
Figure 2B:
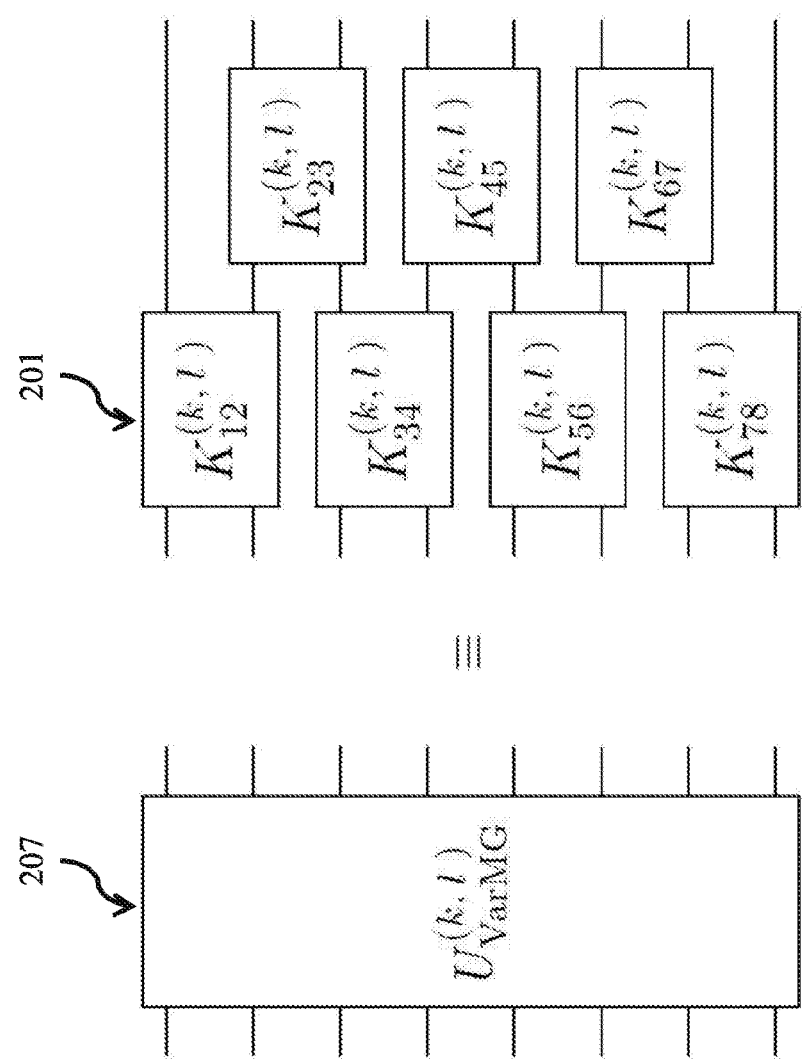
Figure 2C:
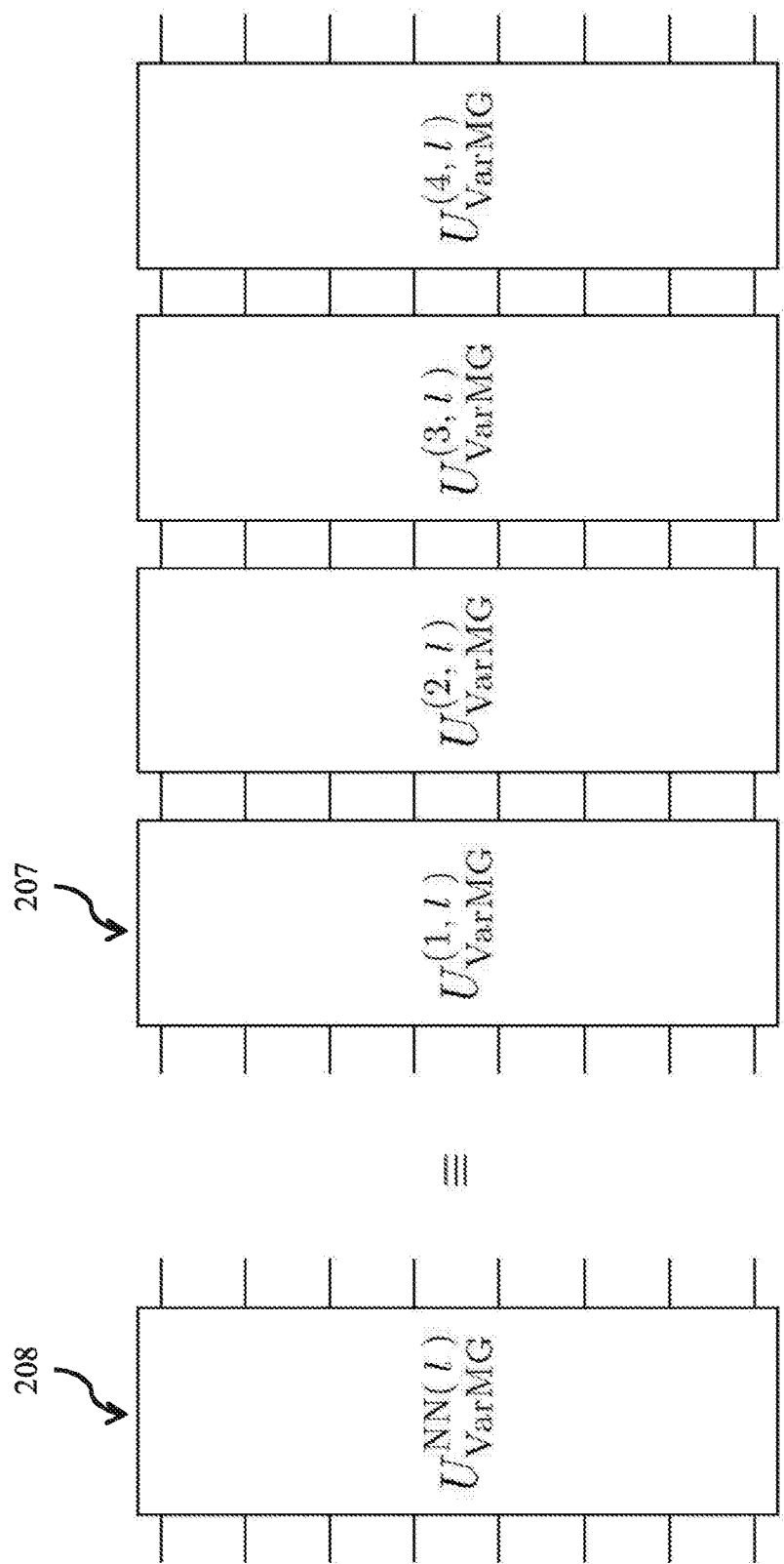
Figure 2D:
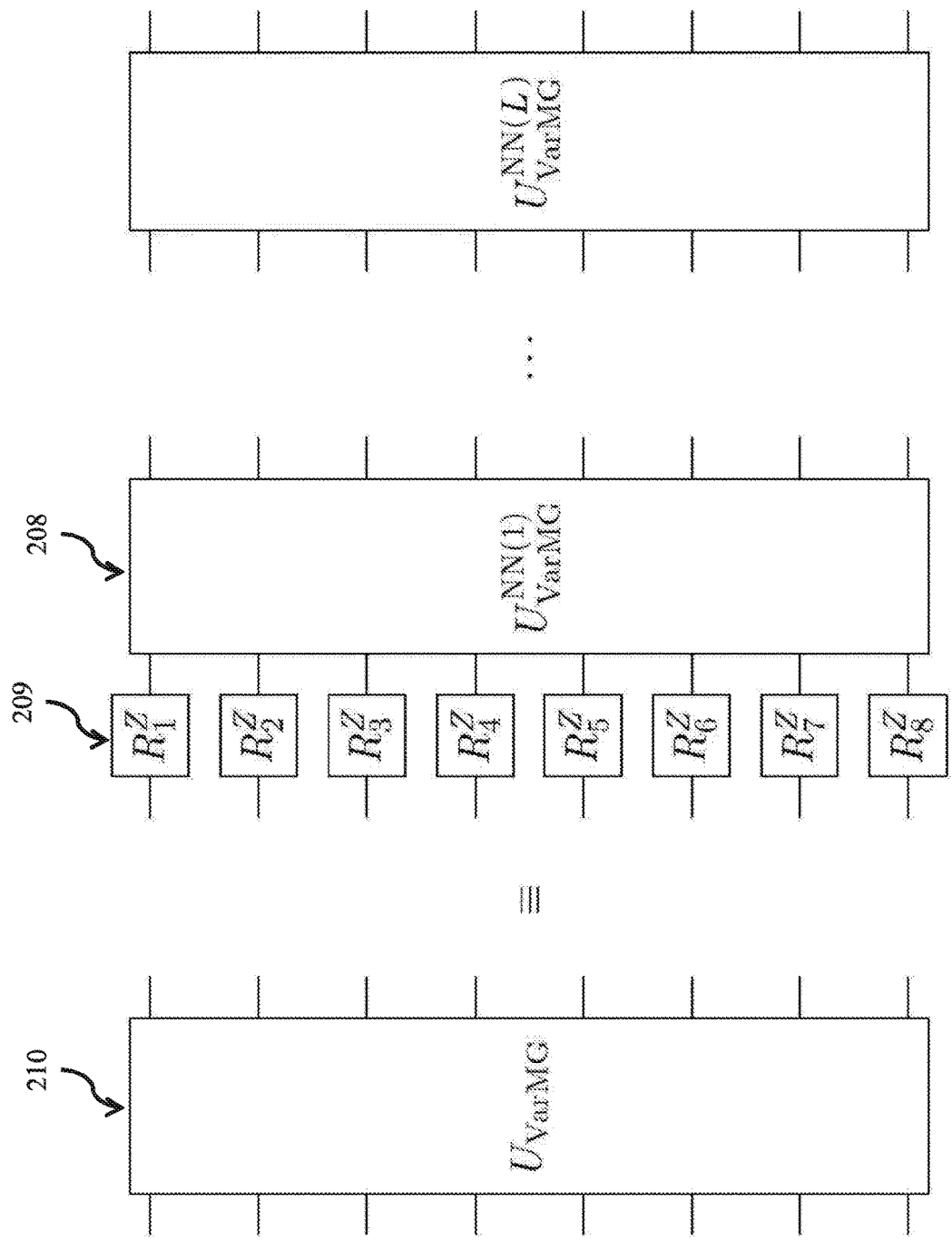
Figure 2E:
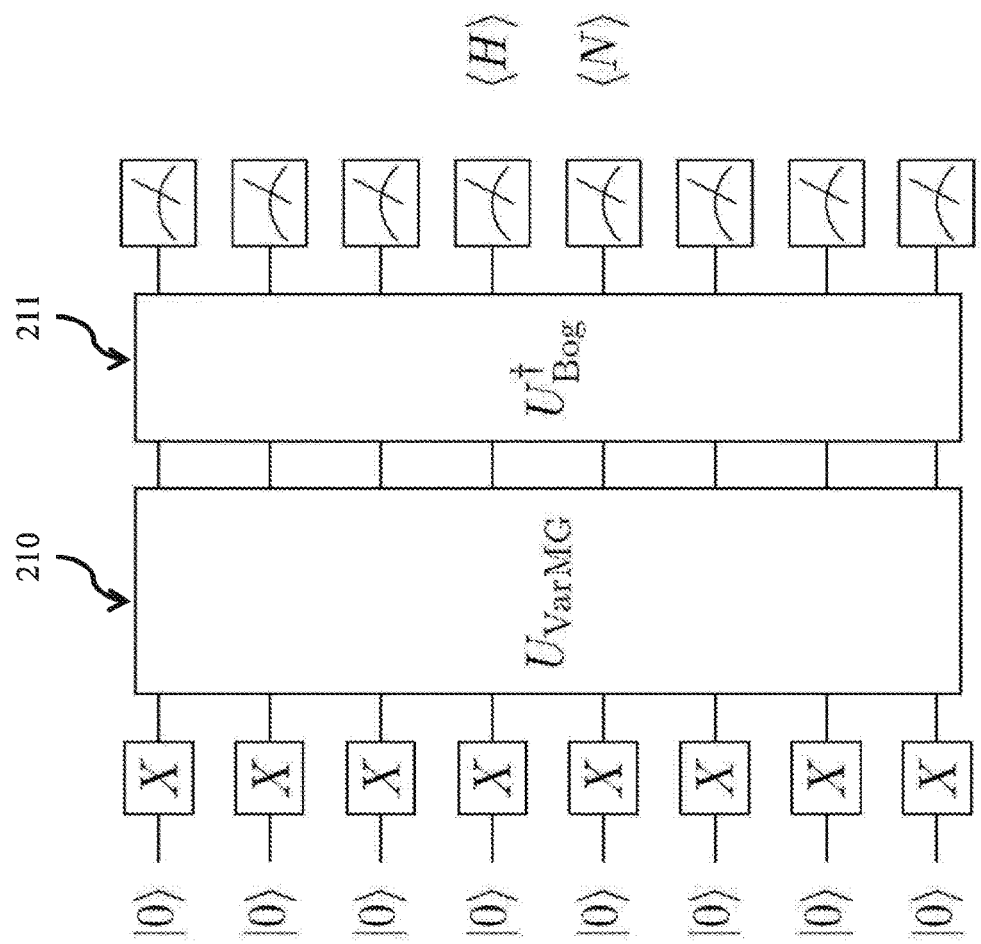

Referring now to FIG. 2, an exemplary quantum circuit implementing $U_{Bog}$ is illustrated according to embodiments of the present disclosure. In this example, an exemplary Gate decomposition is provided of the L-cycle LDCA on a linear chain of 8 qubits. Referring to FIG. 2A, $K_{ij}^{(k,l)}$ 201 is a local operation between qubits i and j composed of 5 rotations $R_{ij}^{-YX(k,l)}$, $R_{ij}^{XY(k,l)}$, $R_{ij}^{ZZ(k,l)}$, $R_{ij}^{-YY(k,l)}$, $R_{ij}^{XX(k,l)}$ 202 . . . 206 for a layer k. Referring to FIG. 2B, unitary $U_{varMG}^{(k,l)}$ 207 for each layer k is built by applying $K_{ij}^{(k,l)}$ 201 in parallel first on the even pairs and then on the odd pairs. Referring to FIG. 2C, a cycle $U_{VarMG}^{NN(l)}$ is composed of a sequence of $$\left\lceil \frac{M}{2} \right\rceil$$

layers 207. Referring to FIG. 2D, the L-cycle construction of $U_{VarMG}$ 210 is shown with one round of variational phase rotations 209. In FIG. 2E, the full LDCA protocol is shown, with the initial preparation of the quasiparticle vacuum and the transformation to the original fermionic basis $U_{Bog}^\dagger$ 211.

As a first step, the quasiparticle vacuum (Equation 5) is prepared in the Bogoliubov picture with $$X = \begin{pmatrix} 0 & 1 \\ 1 & 0 \end{pmatrix}$$

gates acting on each qubits to yield the state $|1\rangle^{\otimes M'}$ in the computational basis. The below defines a L-cycle ansatz built from nearest-neighbor variational matchgates augmented with $\sigma_z \otimes \sigma_z$ rotations. The measurement of the expectation values can be done in the original basis by applying the inverse Bogoliubov transformation $U_{Bog}^\dagger$ defined previously.

In a cycle l of the low-depth circuit ansatz (LDCA), the nearest-neighbor matchgates (Equation 34) are replaced as in Equation 40 where the rotations are defined as in Equation 41.

$$K_{ij}^{(k,l)}(\Theta_{ij}^{(k,l)}) = R_{ij}^{XX(k,l)} R_{ij}^{-YY(k,l)} \times R_{ij}^{ZZ(k,l)} R_{ij}^{XY(k,l)}$$
$$R_{ij}^{-YX(k,l)}. \qquad \text{Equation 40}$$

$$R_{ij}^{-YX(k,l)} = e^{-i\theta_{ij}^{-YX(k,l)}\sigma_y^i\otimes\sigma_x^j}$$

$$R_{ij}^{XY(k,l)} = e^{i\theta_{ij}^{XY(k,l)}\sigma_x^i\otimes\sigma_y^j}$$

$$R_{ij}^{ZZ(k,l)} = e^{i\theta_{ij}^{ZZ(k,l)}\sigma_z^i\otimes\sigma_z^j}$$

$$R_{ij}^{-YY(k,l)} = e^{-i\theta_{ij}^{-YY(k,l)}\sigma_y^i\otimes\sigma_y^j}$$

$$R_{ij}^{XX(k,l)} = e^{i\theta_{ij}^{XX(k,l)}\sigma_x^i\otimes\sigma_x^j}.$$

Equation 41

Each layer k applies those variational rotations in parallel first on the even pairs and then on the odd pairs such that Equation 42 holds.

$$U_{VarMG}^{(k,l)}(\Theta^{(k,l)}) = \Pi_{i\in odd} K_{i,i+1}^{(k,l)}(\Theta_{i,i+1}^{(k,l)}) \times \Pi_{i\in even} K_{i,i+1}^{(k,l)}(\Theta_{i,i+1}^{(k,l)})$$

Equation 42

A cycle l is composed of $$\left\lceil \frac{M}{2} \right\rceil$$

layers such that the variational ansatz is equivalent to a BUCCS transformation when the $\theta_{ij}^{ZZ(k,l)}$ are equal to zero as in Equation 43.

$$U_{VarMG}^{NN(l)}(\Theta^{(l)}) = \prod_{k=1}^{\left\lceil\frac{M}{2}\right\rceil} U_{VarMG}^{(k,l)}(\Theta^{(k,l)})$$

Equation 43

Finally, the L cycle are assembled sequentially to form the complete variational ansatz as in Equation 44 with only one round of variational phase rotations as in Equation 45.

$$U_{VarMG}(\Theta) = \prod_{l=1}^{L} U_{VarMG}^{NN(l)}(\Theta^{(l)}) \prod_{i=1}^{M} R_i^Z(\theta_i^Z)$$

Equation 44

$$R_i^Z(\theta_i^Z) = e^{i\theta_i^Z \sigma_z^i}$$

Equation 45

The variational state therefore has the form as in Equation 46, where the L=0 case is equivalent to producing the GHF state. There are 5 variational angles per $K_{ij}^{(k,l)}$ and M−1 of those terms per layer. Since each cycle has $$\left\lceil \frac{M}{2} \right\rceil$$

layers, a L-cycle circuit has $$5L(M-1)\left\lceil \frac{M}{2} \right\rceil + M$$

variational angles, the extra term arising from the round of phase rotations.

$$|\Psi(\Theta)\rangle = U_{Bog}^\dagger U_{VarMG}(\Theta) \prod_{i=1}^{M} X_i |0\rangle_{\otimes M}$$

Equation 46

Since gates can be operated in parallel in a linear chain of qubits, the circuit depth is $$(10L+8)\left\lceil \frac{M}{2} \right\rceil + 4$$

+4 when accounting for $U_{Bog}^\dagger$ and the initial round of single-qubit X gates (this includes the final single-qubit rotations, $$R_y\left(\frac{\pi}{2}\right) \text{ or } R_x\left(-\frac{\pi}{2}\right)$$

gates (or equivalent), to measure the terms of the Hamiltonian in the form of Pauli strings). Therefore, this VQE scheme is hardware efficient in the sense that the circuit depth is linear in the number of qubits. The accuracy can also be systematically improved by increasing the number of cycles until either convergence is reached or errors dominate the precision of the result.

As described below, an implementation is provided for computing the analytical gradient of the LDCA using quantum resources, which is useful during the optimization procedure in VQE by guiding the search for the ground state and its energy.

When optimizing the ansatz parameters to minimize the total energy, there may be a need to implement gradients depending on the selected optimization procedure. While direct search algorithms are generally more robust to noise than gradient-based approaches, they may require larger numbers of function evaluations. On the other hand, numerical implementations of gradients rely heavily on the step size for accuracy. However, step sizes that are too small may lead to numerical instability, and implementation of step sizes corresponding to desired accuracy are limited by current experimental procedures.

An alternative approach that exhibits high accuracy while maintaining reasonable computational cost may be to evaluate the gradient directly on the quantum computer given that the analytical form of the gradient is available. Here a scheme is provided to implement the analytical gradient of the LDCA unitary using an extra qubit and controlled two-qubit rotations. The unitary for the complete variational ansatz shown in Equation 44, which was called $U_{VarMG}(\Theta)$ parametrized by angles $\Theta$. For this derivation, the products of Z-rotations is ignored in the definition but computing the gradient with respect to these angles should be more straightforward. These initial Z-rotations are not as nested within the LDCA framework, so the gradient corresponding to one of such angles, say $\theta_j$, simply involves inserting a controlled-Z gate following the unitary exp($-i\theta_j Z$), to the circuit (where an ancilla qubit may be used as the control qubit). Thus, we will instead focus on finding the gradients of the term $\prod_{l=1}^{L} U_{VarMG}^{N,N}(\Theta^{(l)})$, which we will call $U_{VarMG}'(\Theta)$.

Consider the state $\Psi(\Theta)|$, prepared by applying $U_{VarMG}(\Theta)$ to $|\Phi_0\rangle$; where $|\Phi_0\rangle$ corresponds to a reference state that does not depend on $\Theta$. Here we wish to compute the derivative of the expectation value of the energy E($\Theta$)= $\langle\Psi(\Theta)|H|\Psi(\Theta)\rangle$ with respect to each parameter in $\Theta$. We will use the label $\theta_{j,n}^{(k,l)}$ for each parameter where j refers to the index of the qubit in the register, l to the circuit cycle, k to the circuit layer, and n to the appropriate Pauli string (in this case, $n \in \{-YX, XY, ZZ, -YY, X X\}$)). Considering a Hamiltonian H that is independent of $\Theta$, the derivative with respect to $\theta_{j,n}^{(k,l)}$ is given by Equation 47 where the operator $V_{j,n}^{(k,l)}(\Theta)$ is nearly identical to the unitary $U_{VarMG}'$ except with a string of Pauli matrices $P_{j,n}^{k,l}$ inserted after the rotation term $R_{j,j+1}^{n(k,l)} = \exp(i\theta_{j,n}^{k,l} P_{j,n}^{k,l})$ included in the nearest-neighbor matchgate term $K_{j,j+1}^{(k,l)}$ and so on.

$$\frac{\partial E(\Theta)}{\partial \theta_{j,n}^{(k,l)}} = \left\langle \Phi_0 \middle| U^\dagger H \frac{\partial U}{\partial \theta_{j,n}^{(k,l)}} \middle| \Phi_0 \right\rangle +$$ Equation 47

$$\left\langle \Phi_0 \middle| \frac{\partial U^\dagger}{\partial \theta_{j,n}^{(k)}} HU \middle| \Phi_0 \right\rangle$$ (47a)

$$= i(\langle \Phi_0 | U^\dagger H V_{j,n}^{(k,l)} | \Phi_0 \rangle -$$ (47b)

$$\langle \Phi_0 | V_{j,n}^{(k,l)\dagger} HU | \Phi_0 \rangle)$$

$$= 2\text{Im}(\langle \Phi_0 | V_{j,n}^{(k,l)\dagger} HU | \Phi_0 \rangle)$$ (47c)

To compute the expectation value of the energy, the Hamiltonian averaging procedure can be employed. This involves measuring the expectation value of every term in the Hamiltonian and summing over them as shown in Equation 48. Each term, called $O_i$, is a product of Pauli matrices obtained by performing the Jordan-Wigner or Bravyi-Kitaev transformation on the corresponding term in the second quantized Hamiltonian from Equation 1.

$$E = \sum_i h_i \langle O_i \rangle$$ Equation 48

Figure 3:
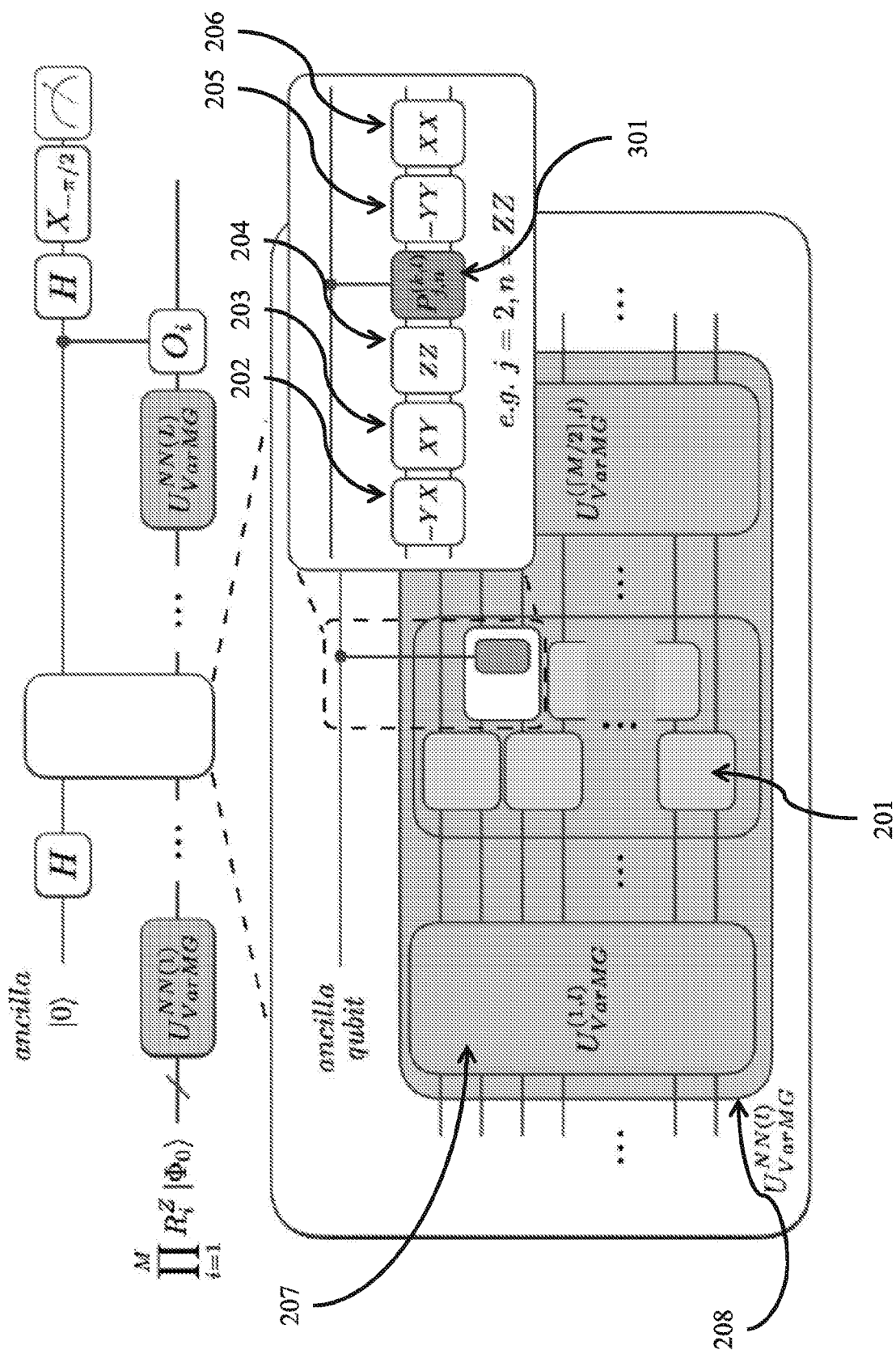
FIG. 3 is a schematic diagram of a quantum circuit according to embodiments of the present disclosure.

Substituting Equation 48 into Equation 47c, the gradient can be expressed as in Equation 49 which can be implemented using a circuit shown in FIG. 3 to obtain the state in Equation 50.

$$\frac{\partial E(\Theta)}{\partial \theta_{j,n}^{(k,l)}} = 2h_i \text{Im}(\langle \Phi_0 | V_{j,n}^{(k,l)\dagger}(\Theta) O_i U(\Theta) | \Phi_0 \rangle)$$ Equation 49

$$|0\rangle \otimes (U|\Phi_0\rangle + O_i V_{j,n}^{(k,l)\dagger} |\Phi_0\rangle) + |1\rangle \otimes \frac{(U|\Phi_0\rangle - O_i V_{j,n}^{(k,l)\dagger} |\Phi_0\rangle)}{2}$$ Equation 50

The imaginary component of $\langle \Phi_0 | V_{j,n}^{(k,l)\dagger} O_i U | \Phi_0 \rangle$ from Equation 49 can then be recovered by measuring the ancilla qubit in the Y-basis. For a practical physical implementation of the gradient, a circuit layout can be used in which the control qubit of the gradient circuit is connected to all qubits in the register.

Referring to FIG. 3, a circuit is illustrated using an ancilla qubit to compute the analytical gradient of an LDCA according to embodiments of the present disclosure. In particular, the imaginary component of $\langle \Phi_0 | V_{j,n}^{(k,l)\dagger} O_i U_{VarMG}' | \Phi_0 \rangle$ is measured in order to compute $$\frac{\partial E(\Theta)}{\partial \theta_{j,n}^{(k,l)}}.$$

In this example, j=2 and n=ZZ. In this example, $P_{j,n}^{(k,l)}$ 301 is inserted into the circuit of FIG. 2 between rotation terms in the nearest-neighbor matchgates.

Below, numerical benchmarks are provided for the BUCC and the LDCA ansatz on small instances of the Fermi-Hubbard model and the automerization reaction of cyclobutadiene. As shown, LDCA is able to prepare the exact ground state of those systems.

The results of numerical testing are provided for the performance of the previously described algorithms on instances of strongly correlated systems in condensed matter and quantum chemistry. The behavior of the ansatz is analyzed on the Fermi-Hubbard model at half-filling at different interaction strengths. The automerization reaction of cyclobutadiene is modeled using a the Pariser-Parr-Pople (PPP) Hamiltonian. In both cases, the Hamiltonians are mapped to 8-qubit registers and the energy and wavefunction accuracies are compared for approximating the exact ground for the following methods ansatzes: GHF, BUCCSD and LDCA with 1 and 2 cycles.

In these cases, the state initialization has 8 single qubit X gates operated in parallel and the inverse Bogoliubov transformation has one layer of single qubit phase rotations and 112 nearest-neighbor matchgates. The state initialization and $U_{Bog}^\dagger$ circuit add up to a circuit depth of 34. The LDCA method adds a layer of variational phase rotations and 140 nearest-neighbor gates per cycle. Therefore 1-cycle LDCA adds 41 to the circuit depth (for a total of 75 with 148 variational parameters) and 2-cycle LDCA adds 81 to the circuit depth (for a total of 115 with 288 variational parameters).

For the numerical examples presented here, 2-cycle LDCA is able to exactly recover the ground state of the simulated systems while 1-cycle LDCA performs better than the GHF solution but is not as accurate as BUCCSD. The 2-cycle LDCA has more variational parameters (288) than the dimensions of the Hilbert space ($2^8$=256) but the depth of the circuit is much shorter than what could be achieved with BUCC up to 4th order, which is required to recover the exact ground state of systems studied.

The Fermi-Hubbard model is a prototypical example of correlated electrons. It is described by a tight-binding lattice of electrons interacting through a local Coulomb force. The Hamiltonian is given by Equation 51 where t is the kinetic energy between nearest-neighbor sites $\langle p, q \rangle$, U is the static Coulomb interaction and $\mu$ is the chemical potential.

$$H^{FH} = -t \sum_{\langle p,q \rangle} \sum_{\sigma=\uparrow,\downarrow} (a_{p\sigma}^\dagger a_{q\sigma} + a_{q\sigma}^\dagger a_{p\sigma}) - \mu \sum_p \sum_{\sigma=\uparrow,\downarrow} (n_{p\sigma} - \frac{1}{2}) + U \sum_p (n_{p\uparrow} - \frac{1}{2})(n_{p\downarrow} - \frac{1}{2}),$$ Equation 51

The number operator is $n_{p\sigma} = a_{p\sigma}^\dagger a_{q\sigma}$. While the one-dimensional Fermi-Hubbard model can be solved exactly with the Bethe ansatz, the two-dimensional version can only be solved exactly for very specific values of the parameters and a general solution remains elusive. The phase diagram of the 2D model is known to be very rich and there are strong arguments that a better understanding of the model could notably yield the key to explain the physics of high-temperature cuprate superconductors.

Alternative hybrid quantum-classical methods to systematically approximate the phase diagram of the Fermi-Hubbard model in the thermodynamical limit require preparing the ground state of a large cluster of the model with an accuracy that cannot be reached by alternative methods. Here, the performance of the ansatz detailed above is described on an example of a 2×2 cluster of the Fermi-Hubbard model at half-filling ($\mu$=0) that can be implemented on a 8-qubit quantum processor. As shown in FIG. 4, the GHF method performs well for small values of the interaction strength $$\frac{U}{t}$$

and exactly describes the tight-binding case where the Hamiltonian is quadratic. The BUCCSD ansatz offers a significant improvement over the GHF solution but fails to reach the exact ground state at strong interaction strengths. While 1-cycle LDCA ansatz offers an intermediate solution between GHF and BUCCSD, the 2-cycle LDCA solution is able to reach the exact ground state up to numerical accuracy for all values of the interaction strength. In all cases the preparation fidelity $|\langle\Psi(\Theta)|\Psi_0\rangle|^2$ is directly correlated with the energy difference $\delta E$ between the prepared state and the exact ground state $|\Psi_0\rangle$. All methods are able to handle Hamiltonians with pairing terms by introducing an artificial $\Delta\Sigma_i(a_{i\uparrow}^\dagger a_{i\downarrow}^\dagger + a_{i\downarrow}a_{i\uparrow})|$. The accuracy of all methods improves with increasing $$\frac{\Delta}{t}$$

as the ground state gets closer to a fermionic Gaussian state.

Referring now to FIG. 4, graphs of the fidelity and energy difference are provided relative to the interaction parameter. In FIG. 4A, the fidelity of the ground state preparation of a 2×2 cluster of the Fermi-Hubbard model is plotted as a function of the interaction parameter U. The energy difference with the exact ground state with respect to the various methods is shown in FIG. 4B. The energies are normalized by the hopping term t. In FIGS. 4C-D, the fidelity and the energy difference are plotted in the case of an attractive cluster $$\frac{U}{t} = -8$$

with an additional s-wave pairing term $\Delta$.

A one-dimensional cluster of the Fermi-Hubbard model was also tested with 2 sites, showing that it was possible to reach the exact ground state with both BUCCSD and the 1-cycle LDCA method for all values of the parameter U. The fact that a 2×1 cluster requires only 1 cycle and that the 2×2 case reaches the ground state in 2 cycles suggests that the scaling is not an exponential function of the cluster size.

As an example of a quantum chemistry application, the accuracy of the proposed methods is evaluated against the description of cyclobutadiene automerization. The study of this reaction has been particularly challenging for theoretical chemists due to the strongly correlated character of the open-shell $D_{4h}$ transition state in contrast with the weakly correlated character of the closed-shell $D_{2h}$ ground state ($^1A_{1g}$). An accurate theoretical treatment of the transition state would allow confirmation of several observations about the mechanism, such as the alleged change in the aromatic character of the molecule between its ground and transition states as well as the involvement of a tunneling carbon atom in the reaction. In addition, it would serve as a confirmation of the energy barrier for the automerization, for which experimental reports vary between 1.6 and 12.0 kcal/mol.

Although the Hamiltonian for cyclobutadiene can be obtained from a Hartree-Fock or a Complete Active Space (CAS) standard quantum chemistry calculation, we opted to describe the reaction using a Pariser-Parr-Pople (PPP) model Hamiltonian. The PPP model captures the main physics of π-electron systems such as cyclobutadiene and also establishes a direct connection to the Fermi-Hubbard Hamiltonian described above. Using this model, the Hamiltonian of cyclobutadiene can be written as in Equation 52 where $E_{ij}=\Sigma_{\sigma=\alpha,\beta}a_{i\sigma}^\dagger a_{j\sigma}+a_{j\sigma}^\dagger a_{i\sigma}$, $n_{i\sigma}=a_{i\sigma}^\dagger a_{i\sigma}$, and the variables $\gamma_{ij}$ are parameterized by the Mataga-Nishimoto formula as in Equation 53.

$$H^{PPP} = \sum_{i<j} t_{ij}E_{ij} + \sum_i U_i n_{i\alpha}n_{i\beta} + \qquad \text{Equation 52}$$

$$V_c + \frac{1}{2}\sum_{ij}\gamma_{ij}(n_{i\alpha}+n_{i\beta}-1)(n_{j\alpha}+n_{j\beta}-1)$$

$$\gamma_{ij}(r_{ij}) = \frac{1}{1/U+r_{ij}} \qquad \text{Equation 53}$$

The $t_{ij}$, U, $V_c$ and parameters were obtained as a function of the dimensionless reaction coordinate, $\lambda$, and the geometries of the ground as well as transition states were optimized at this level of theory.

Figure 4A:
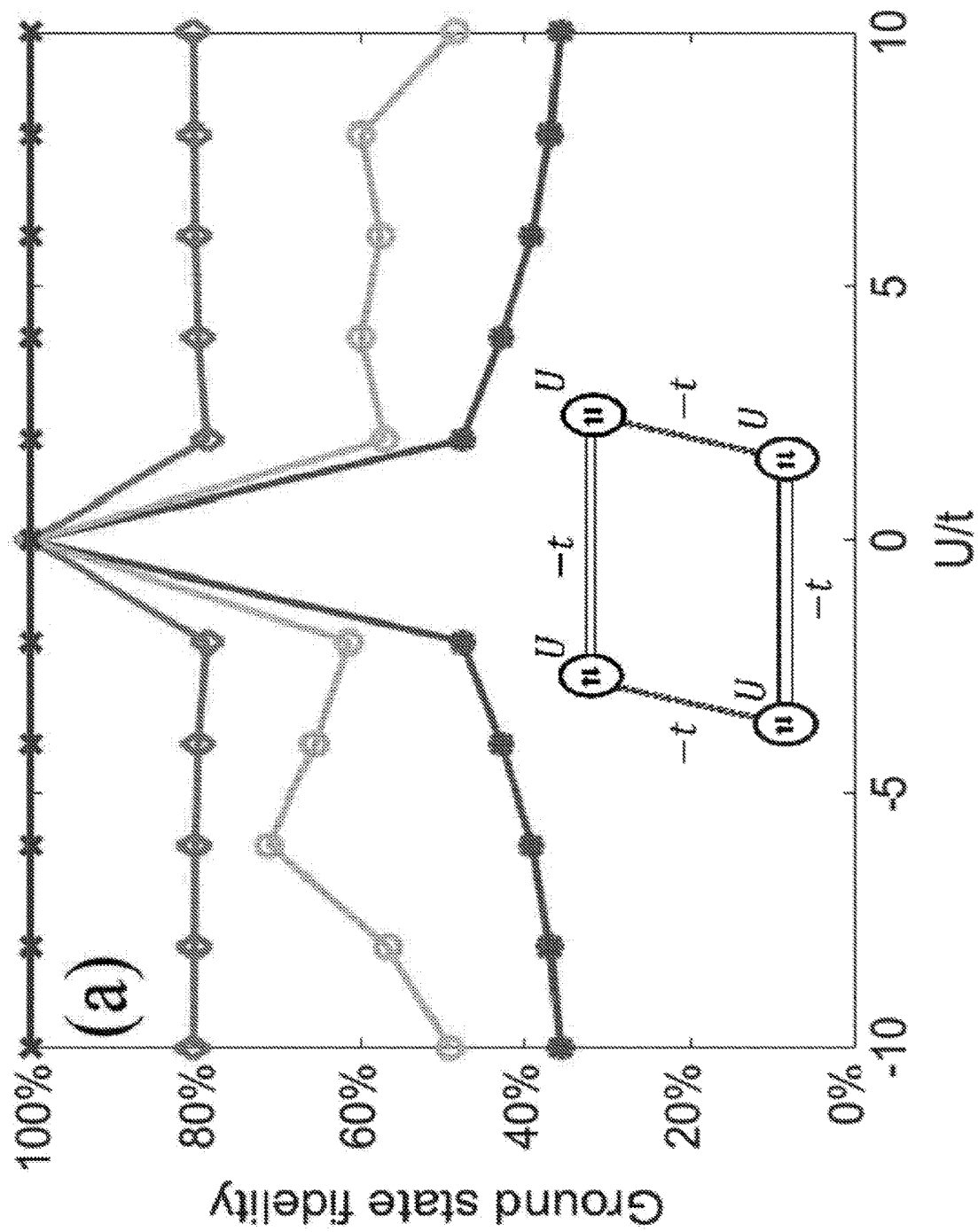
FIG. 4A-D are plots of ground state fidelity of quantum circuits according to embodiments of the present disclosure.
Figure 4B:
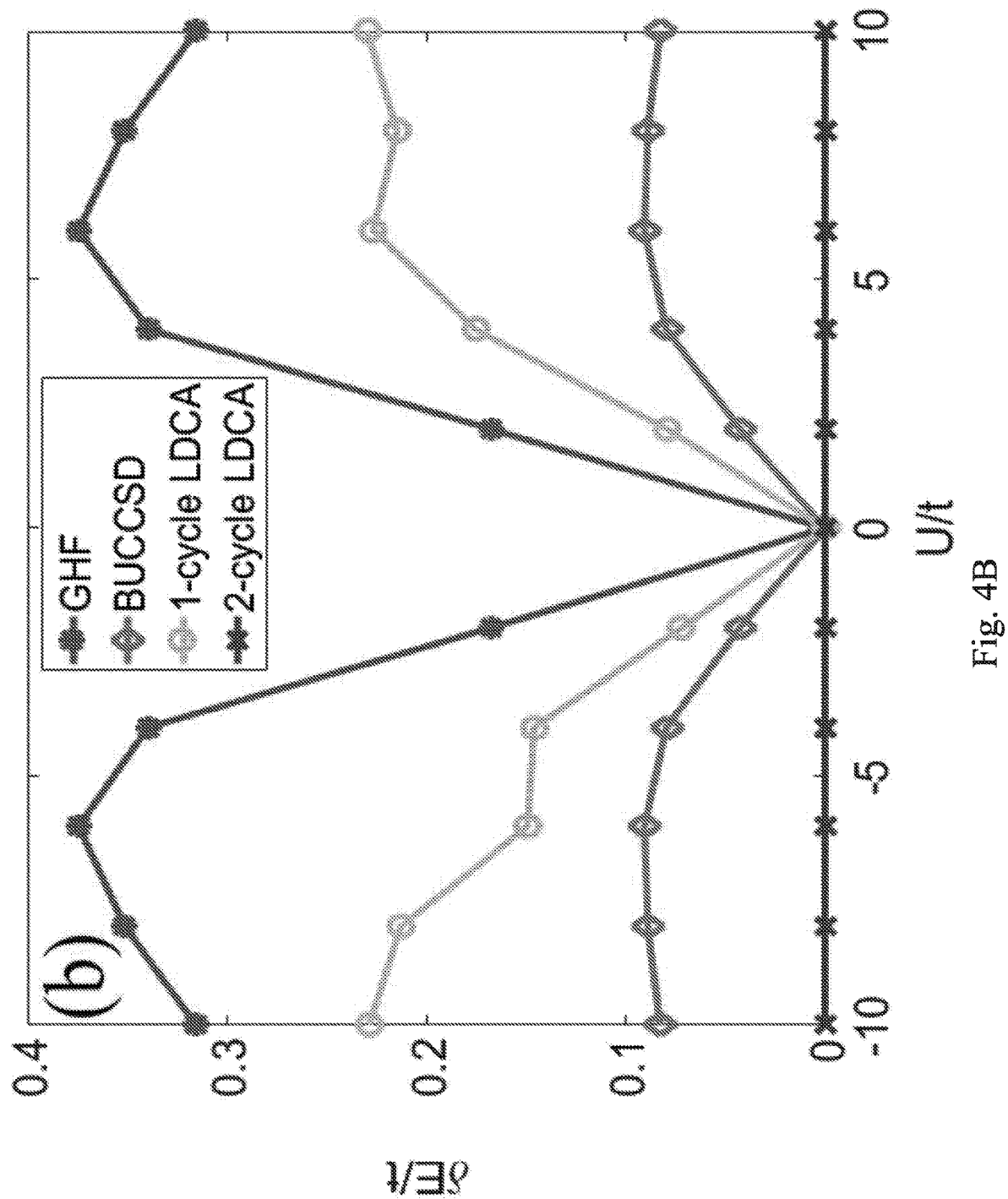
Figure 4C:
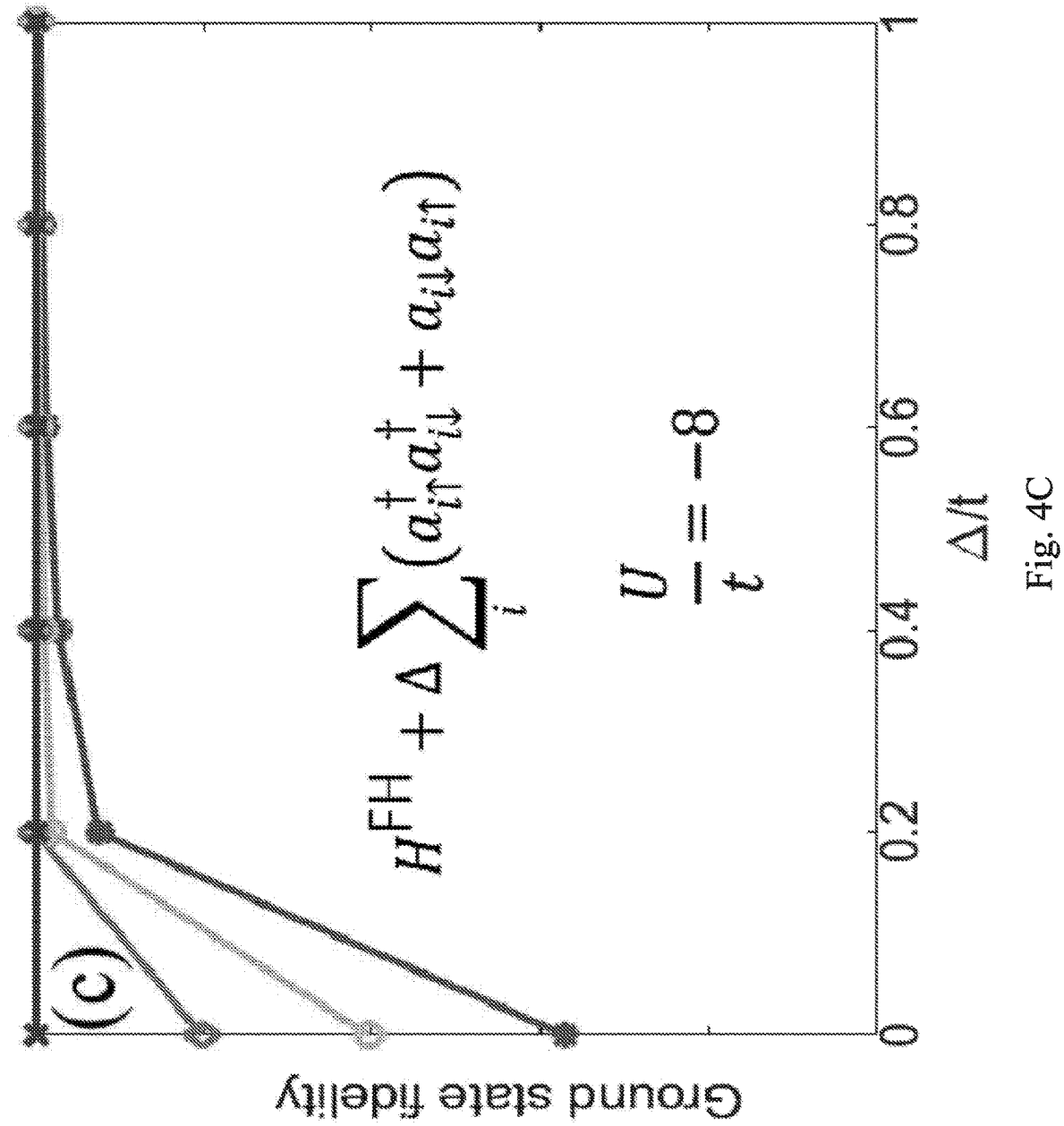
Figure 4D:
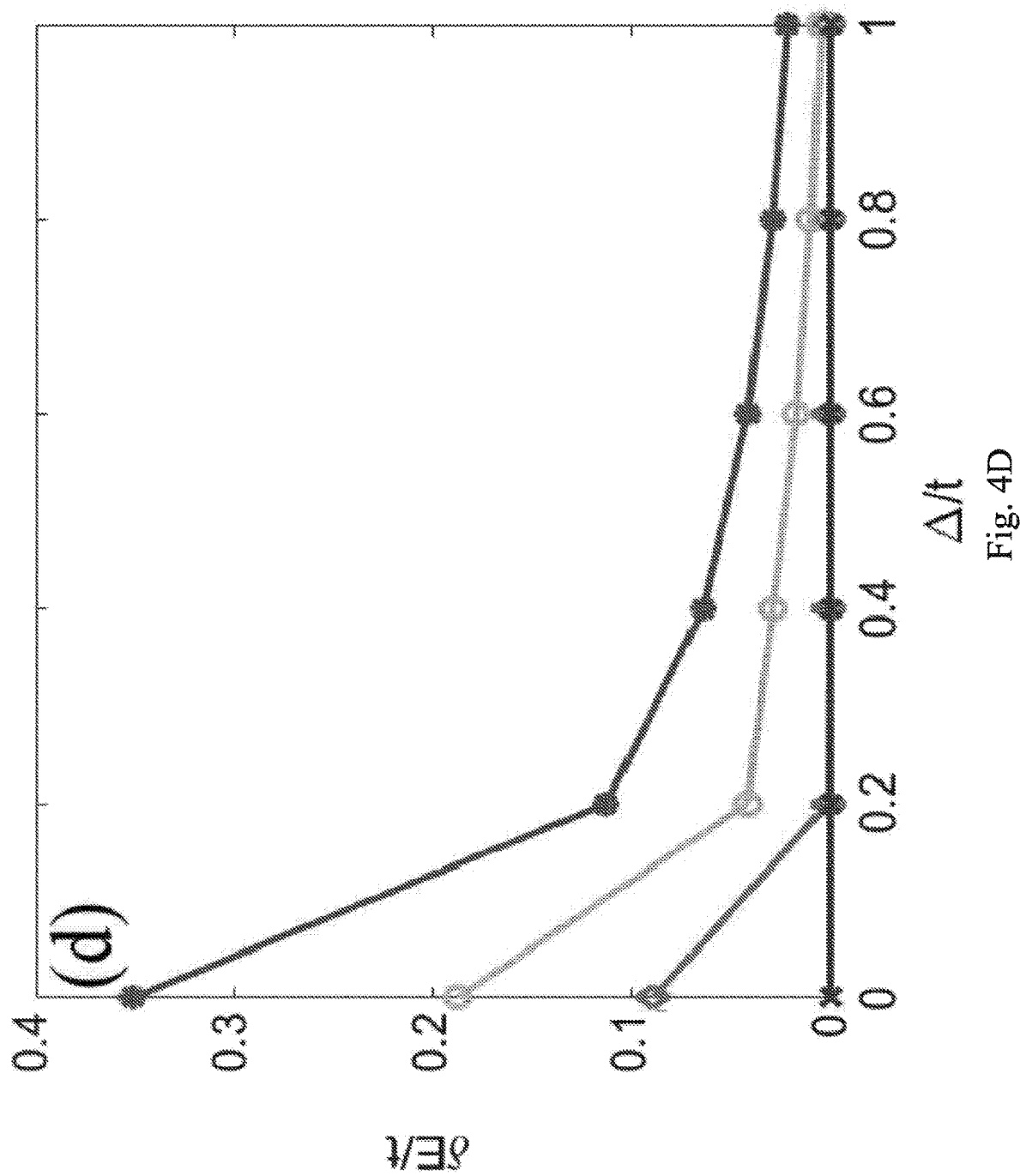
Figure 5A:
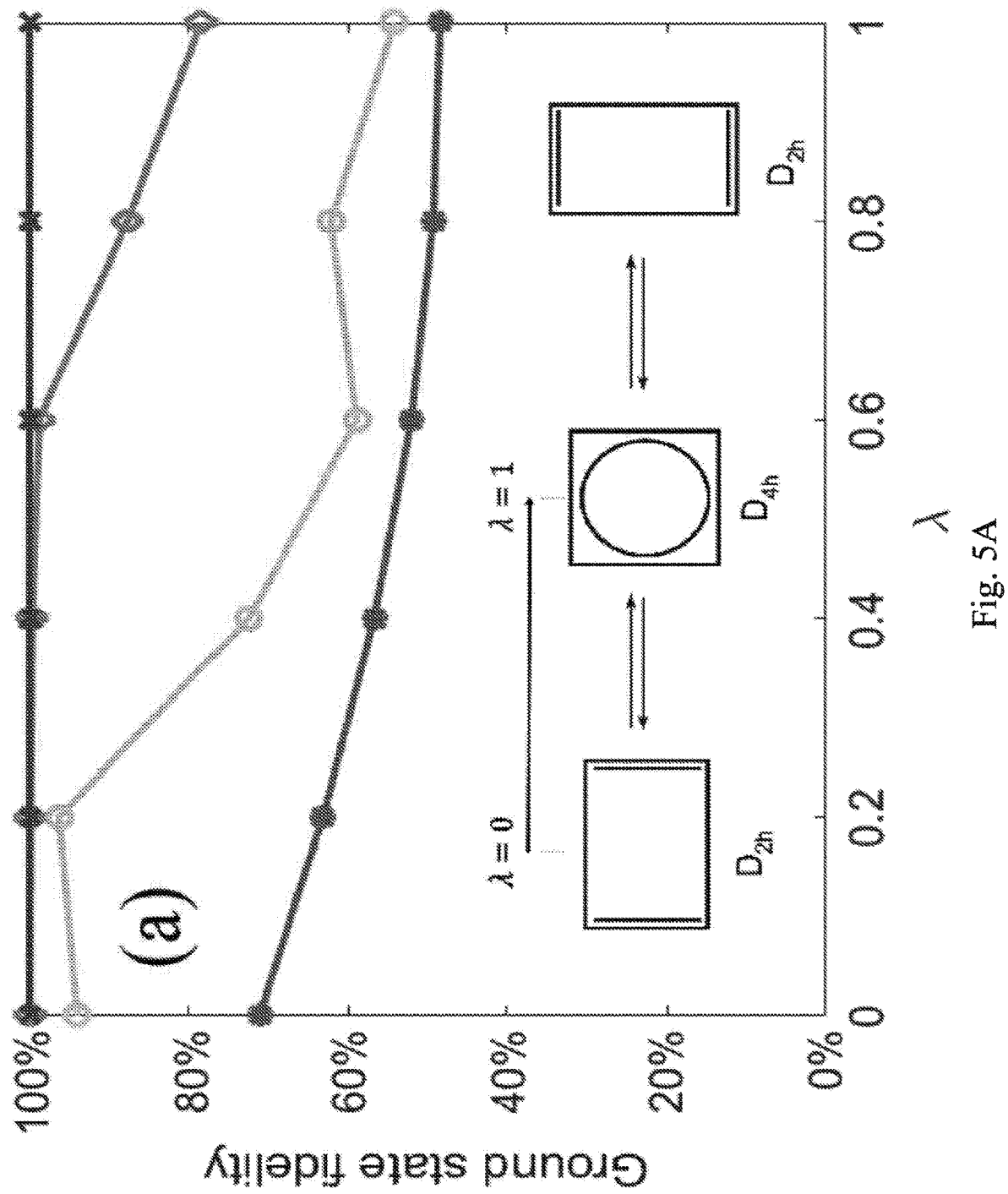
FIGS. 5A-B are plots of ground state fidelity of quantum circuits according to embodiments of the present disclosure.
Figure 5B:
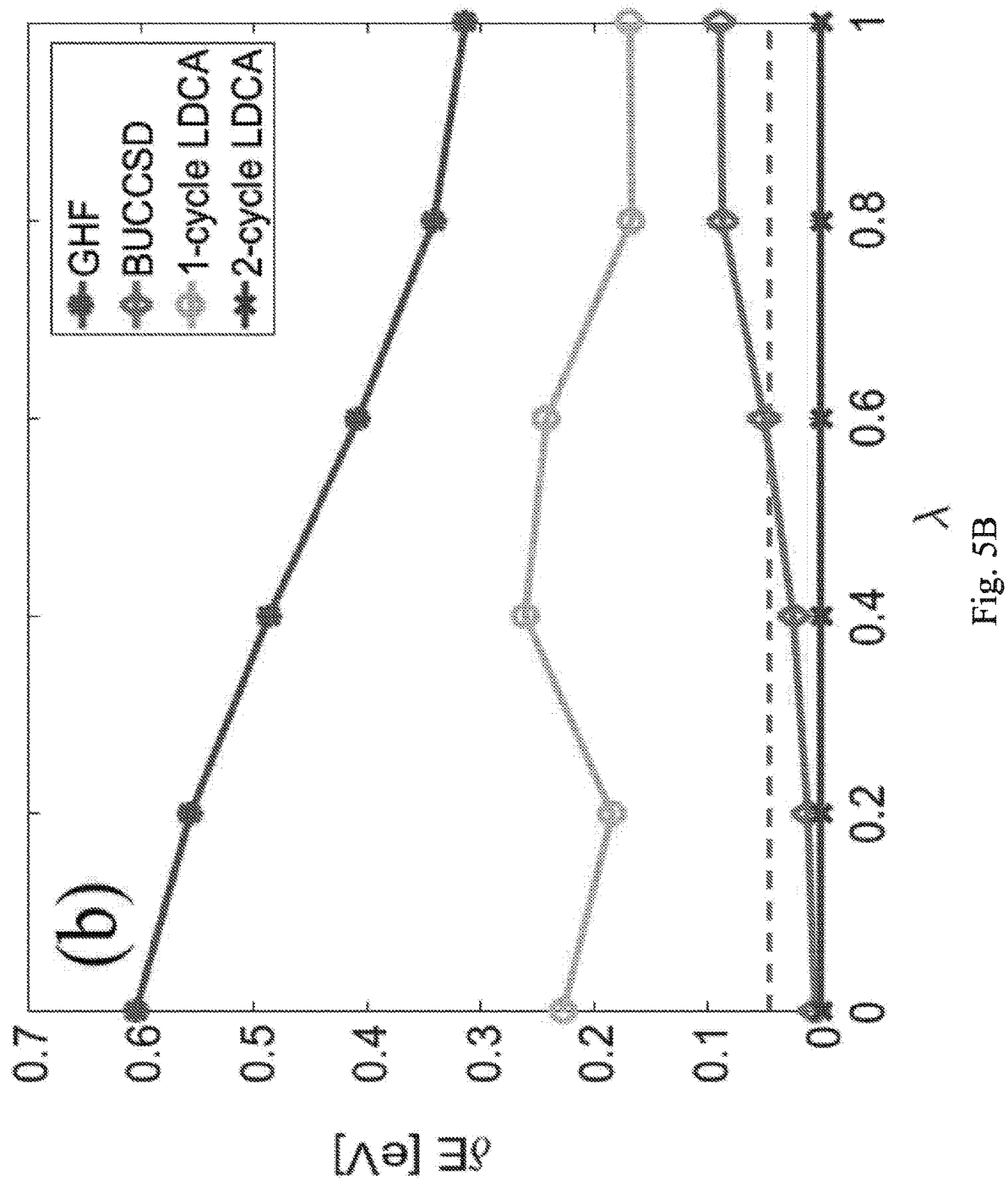

FIG. 5 compares the accuracy of different ansatzes for the cyclobutadiene automerization reaction, plotting fidelity and energy difference against a dimensionless reaction coordinate. In FIG. 4A, the fidelity of the ground state preparation along the automerization reaction path of cyclobutadiene is plotted. In FIG. 4B, the difference from the exact ground state is plotted for the various ansatz. Chemical accuracy is approximately 0.043 eV (dashed line).

The GHF ansatz is considerably improved by BUCCSD close to the $D_{2h}$ ground state but the improvement is less prominent as we approach the strongly correlated $D_{4h}$ transition state. As in the 2×2 Fermi-Hubbard case, the 1-cycle LDCA method yields accuracies between those of GHF and BUCCSD while the 2-cycle LDCA method produces the numerically exact ground state for all values of $\lambda$. This suggests that the LCDA ansatz is useful for treating cases of strong correlation in quantum chemistry.

The results presented above show that the LDCA ansatz can outperform other ansatzes employed for VQE calculations, such as BUCC, both in accuracy and efficiency. The LDCA scheme inherits some properties of this ansatz. For instance, in the limit of 1-cycle LDCA with all $\theta_{ij}^{ZZ(k,l)}$ set to zero, we recover the BUCC ansatz with single excitations. This choice of parameters cannot improve the GHF solution since it only amounts to a basis rotation of the fermionic mode for which the Bogoliubov transformation has already been optimized. Since the mapping (Equation 35) between the Bogoliubov transformation and the matchgate circuit relies on the Jordan-Wigner transformation which associates Pauli strings of length O(M) to fermionic operators, it may be possible to further reduce the length of the measured Pauli strings by working out a similar mapping in the Bravyi-Kitaev basis where operators are represented by strings of length O(log M). Numerical benchmark are provided for the UCCSD scheme, which provides the same results as BUCCSD. This is expected in the case of Hamiltonians with no explicit pairing terms. However, such terms may appear in variational self-energy functional theory where fictitious pairing terms are added to a cluster Hamiltonian to recover the magnetic and superconducting phase diagram in the thermodynamic limit.

Regarding the number of variational parameters, the LDCA ansatz scales as $O(LM^2)$ compared to $O(M^4)$ for UCCSD and BUCCSD with Gaussian basis set. Constraints on the variational parameters of LDCA may reduce their total number. To explore whether it was possible to only measure $\langle H \rangle$ in the variational procedure, we tried the ansatz with only number conserving terms (such that all $\theta_{ij}^{XY(k,l)} = \theta_{ii}^{-YX(k,l)} = 0$.) on the Fermi-Hubbard model but found a reduced overlap with the exact ground state. This implies that a reconfiguration of the pairing amplitudes with respect to the GHF reference state is an important condition to reach an accurate ground state.

The estimates of the circuit depth assume a quantum architecture consisting of a linear chain of qubits, which maximizes the parallel application of gates through the algorithm. Further improvements may be achieves by using an architecture with increased connectivity. It is also assumed that nearest-neighbor two-qubit gates could be implemented directly (as proposed for a linear chain of polar molecules). Although this is not the case on current ion trap and superconducting circuit technologies, the required gates can be implemented as long as tunable nearest-neighbor entangling gates are available. In this case, only additional single-qubit basis rotation suffices, adding only a small overhead in circuit depth.

Due to its better accuracy and reduced scaling in depth and number of parameters compared to previous ansatzes, the LDCA approach provides an avenue for studying strongly correlated systems in near-term quantum devices. In this case, various strategies may be employed to ensure a better performance of the ansatz on real quantum processors with control inaccuracies. For instance, we could calibrate the angles of the gate sequence of $U_{Bog}^\dagger$ by minimizing the difference between the values of $\langle H \rangle$ and $\langle N \rangle$ measured on the quantum computer and the values obtained numerically for the GHF reference state. Similarly, it should be possible to experimentally estimate the errors on the energy and the number of particles for a given L-cycle LDCA ansatz by comparing the values of $\langle H \rangle$ and $\langle N \rangle$ obtained with all $\theta_{ij}^{ZZ(k,l)}$ set to zero with the exact classical results computed as described above. Instead of setting $\theta_{ij}^{ZZ(k,l)}$ to zero, one might also replace the ZZ rotations with equivalent time delays.

This formalism should be general enough to implement the simulation of nucleons. Similarly, these methods could be employed to study the ground state of gauge theories in the quantum link model.

As described above, the Bogoliubov coupled cluster ansatz is generalized to a unitary framework such that it can be implemented as a VQE scheme on a quantum computer. The required GHF reference state can be computed from the theory of fermionic Gaussian states. Those states include Slater determinants used in quantum chemistry as well as mean field superconducting BCS states. A procedure is described to prepare fermionic Gaussian states on a quantum computer using a circuit of nearest-neighbor matchgates with linear depth on the size of the system. By augmenting the set of available gates with nearest-neighbor $\sigma_z \otimes \sigma_z$ rotations, we constructed a low-depth circuit ansatz (LDCA) that can systematically improve the preparation of approximate ground states for fermionic Hamiltonians. Each added cycle increases linearly the depth of the quantum circuit, which makes it practical for implementations in near-term quantum devices.

A cluster of the Fermi-Hubbard model and the automerization of Cyclobutadiene are used as examples to assess the accuracy of the BUCC and LDCA ansatzes. The results show that the LDCA ansatz has the potential to accurately described the exact ground state of strongly correlated fermionic systems on a quantum processor. In addition, the proposed BUCC and LDCA approaches can be used to approximate the ground states of Hamiltonians with pairing fields. This feature extends the range of applicability of VQE to problems in condensed matter and nuclear physics. Since the number of particles is not conserved in BUCC and LDCA, constraints are imposed on the number of particles to carry out the optimization in the classical computer.

Figure 6:
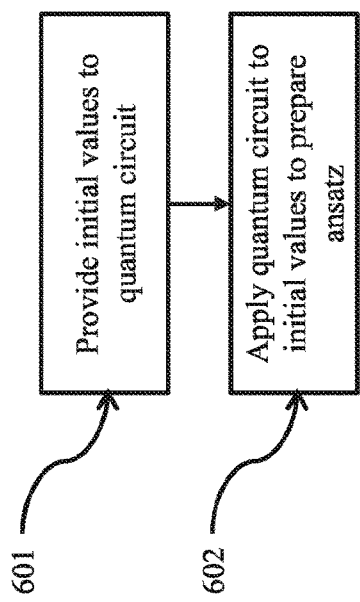
FIG. 6 is a flowchart illustrating a method of configuring a quantum circuit to determine a ground state of a correlated fermionic system according to embodiments of the present disclosure.

Referring now to FIG. 6, a method of configuring a quantum circuit to determine a ground state of a correlated fermionic system is illustrated according to embodiments of the present disclosure. The quantum circuit comprises a linear chain of qubits, and at least one block comprising a plurality of layers arranged in series. Each layer comprises a plurality of matchgates. Each of the plurality of matchgates operates on adjacent qubits in the linear chain and comprises a plurality of two-qubit rotations. At 601, initial values for the linear chain of qubits are provided to the quantum circuit. At 602, the quantum circuit is applied to the linear chain of qubits to prepare an ansatz on the linear chain of qubits, the ansatz corresponding to a fermionic Gaussian state.

Figure 7:
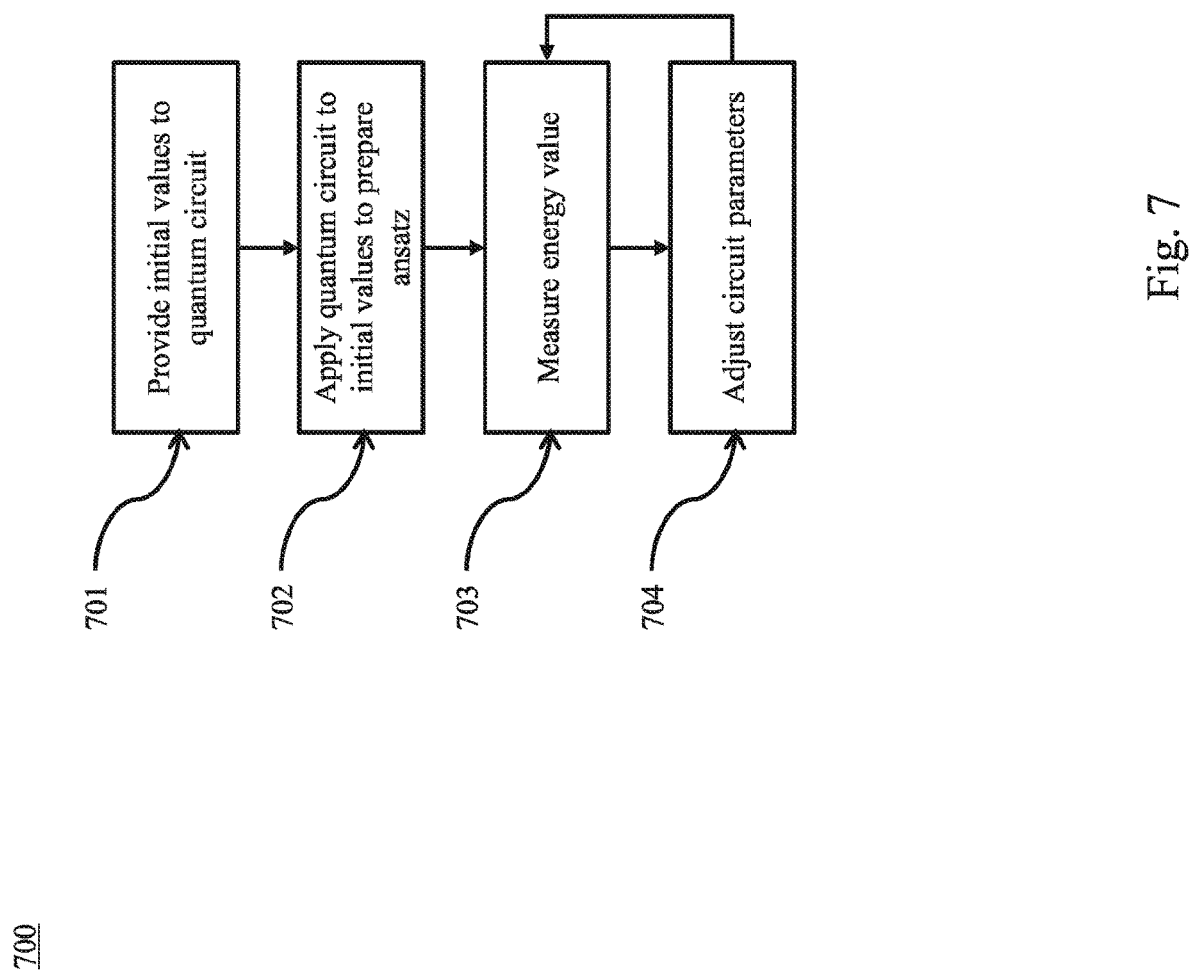
FIG. 7 is a flowchart illustrating a method of determining a ground state of a correlated fermionic system according to embodiments of the present disclosure.

Referring now to FIG. 7, a method of determining a ground state of a correlated fermionic system is illustrated according to embodiments of the present disclosure. The quantum circuit comprises a linear chain of qubits, and at least one block comprising a plurality of layers arranged in series. Each layer comprises a plurality of matchgates. Each of the plurality of matchgates operates on adjacent qubits in the linear chain and comprises a plurality of two-qubit rotations. At 701, initial values for the linear chain of qubits are provided to the quantum circuit. At 702, the quantum circuit is applied to the linear chain of qubits to prepare an ansastz on the linear chain of qubits, the ansatz corresponding to a fermionic Gaussian state. At 703, a first energy value is measured from the quantum circuit. At 704, based on the first energy value, a plurality of configuration parameters of the quantum circuit are adjusted to minimize a second energy value measured from the quantum circuit.

Figure 8:
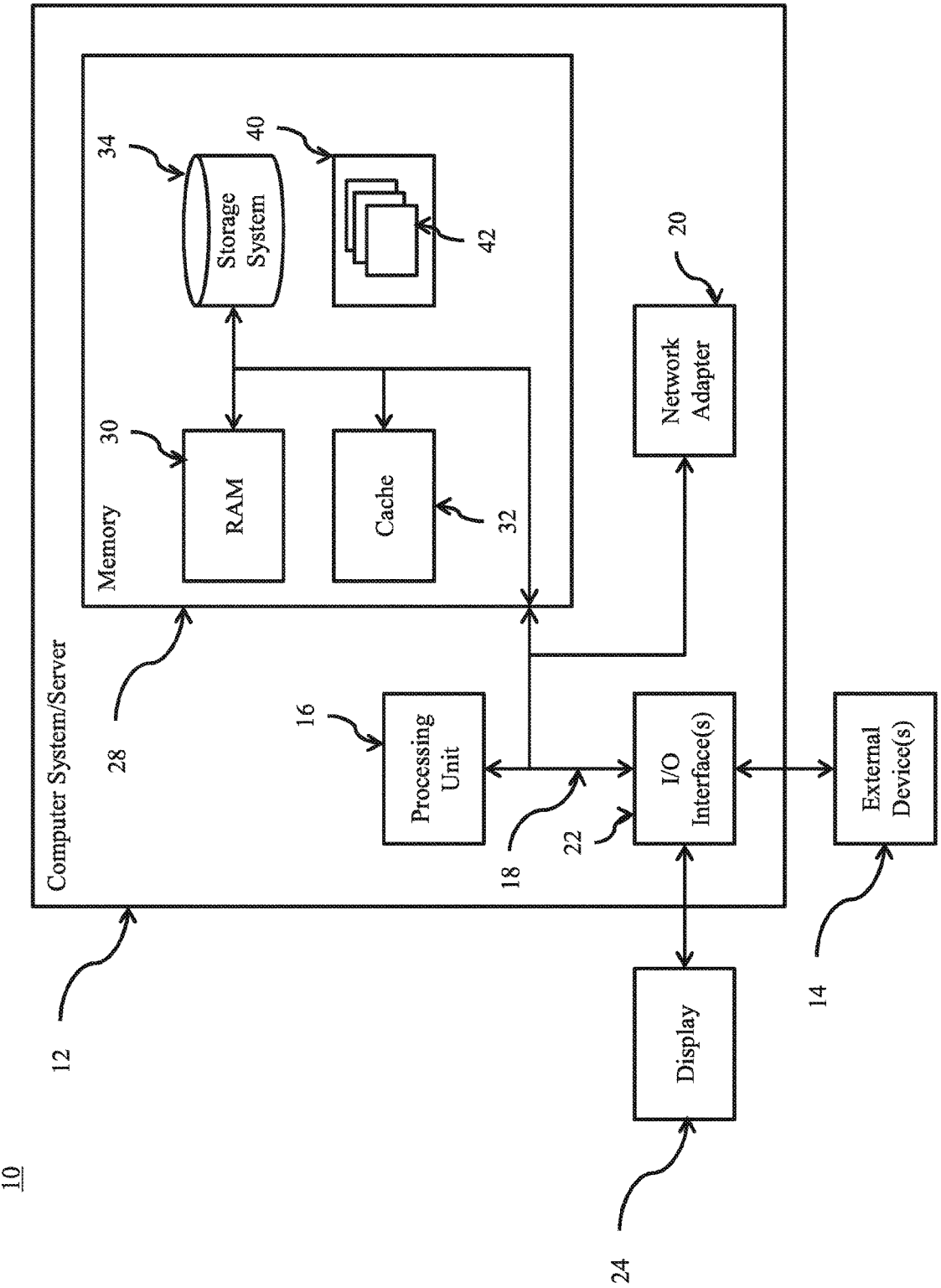
FIG. 8 depicts a computing node according to an embodiment of the present invention.

Referring now to FIG. 8, a schematic of an example of a classical computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of preparing an ansatz to determine a ground state of a correlated fermionic system, wherein the quantum circuit comprises:
    a linear chain of qubits; and
    a plurality of matchgates arranged in layers, each matchgate configured to perform a first two-qubit rotation on neighboring qubits within the linear chain,
    the method comprising:
    providing an initial state for each qubit in the linear chain; and
    applying the quantum circuit to the initial state, thereby preparing an ansatz on the linear chain of qubits, the ansatz corresponding to a fermionic state.

2. The method of claim 1, wherein the fermionic state is Gaussian.

3. The method of claim 1, wherein the quantum circuit further comprises:
    a plurality of two-qubit gates arranged in layers, the layers arranged in series to form a block, each of the two-qubit gates configured to perform a second two-qubit rotation on neighboring qubits within the linear chain, wherein the rotation comprises a ZZ rotation.

4. The method of claim 3, wherein the fermionic state is non-Gaussian.

5. The method of claim 3, wherein the quantum circuit comprises at least one additional block.

6. The method of claim 1, wherein the linear chain of qubits comprises eight qubits.

7. The method of claim 1, wherein the linear chain consists of a first number of qubits, and the layers of matchgates consist of a second number of layers, and wherein the second number is less than or equal to half the first number.

8. The method of claim 3, wherein the linear chain consists of a first number of qubits, and the layers in the block consist of a second number of layers, and wherein the second number is less than or equal to half the first number.

9. The method of claim 1, wherein the initial state correspond to a quasiparticle vacuum state.

10. The method of claim 3, wherein the quantum circuit further comprises gates configured to perform a rotation on each qubit of the linear chain in advance of the block.

11. The method of claim 1, wherein the plurality of matchgates is arranged in two sequential groups, the matchgates of each group being applied in parallel.

12. The method of claim 3, wherein the plurality of two-qubit gates is arranged in two sequential groups, the gate of each group being applied in parallel.

13. A quantum circuit for determining a ground state of a correlated fermionic system, the quantum circuit comprising:
 a linear chain of qubits; and
 a plurality of matchgates arranged in layers, each matchgate configured to perform a first two-qubit rotation on neighboring qubits within the linear chain.

14. The quantum circuit of claim 13, further comprising:
 a plurality of two-qubit gates arranged in layers, the layers arranged in series to form a block, each of the two-qubit gates configured to perform a second two-qubit rotation on neighboring qubits within the linear chain, wherein the rotation comprises a ZZ rotation.

15. The quantum circuit of claim 14, comprising at least one additional block.

16. The quantum circuit of claim 13, wherein the linear chain of qubits comprises eight qubits.

17. The quantum circuit of claim 13, wherein the linear chain consists of a first number of qubits, and the layers of matchgates consist of a second number of layers, and wherein the second number is less than or equal to half the first number.

18. The quantum circuit of claim 14, wherein the linear chain consists of a first number of qubits, and the layers in the block consist of a second number of layers, and wherein the second number is less than or equal to half the first number.

19. The quantum circuit of claim 14, further comprising gates configured to perform a rotation on each qubit of the linear chain in advance of the block.

20. The quantum circuit of claim 13, wherein the plurality of matchgates is arranged in two sequential groups, the matchgates of each group being applied in parallel.

21. The quantum circuit of claim 14, wherein the plurality of two-qubit gates is arranged in two sequential groups, the gate of each group being applied in parallel.

22. A method of determining a ground state of a correlated fermionic system, the method comprising:
 configuring a quantum circuit having a plurality of configuration parameters, the quantum circuit comprising:
  a linear chain of qubits; and
  a plurality of matchgates arranged in layers, each matchgate configured to perform a first two-qubit rotation on neighboring qubits within the linear chain,
 providing an initial state for each qubit in the linear chain;
 applying the quantum circuit to the initial state, thereby preparing an ansastz on the linear chain of qubits, the ansatz corresponding to a fermionic state;
 using the quantum circuit to determine a first energy value of the correlated fermionic system;
 based on the first energy value, adjusting the plurality of configuration parameters;
 using the quantum circuit to determine a second energy value of the correlated fermionic system, wherein the configuration parameters are adjusted to minimize the second energy value.

23. The method of claim 22, wherein adjusting a plurality of configuration parameters comprises optimizing the plurality of configuration parameters using a classical computing node.

24. The method of claim 22, wherein the first energy value is a function of the configuration parameters, the function having a gradient, the method further comprising:
 determining the gradient.

25. The method of claim 22, wherein the fermionic state is Gaussian.

26. The method of claim 22, wherein the quantum circuit further comprises:
 a plurality of two-qubit gates arranged in layers, the layers arranged in series to form a block, each of the two-qubit gates configured to perform a second two-qubit rotation on neighboring qubits within the linear chain, wherein the rotation comprises a ZZ rotation.

27. The method of claim 24, wherein the fermionic state is non-Gaussian.

28. The method of claim 24, wherein the quantum circuit comprises at least two blocks.

29. The method of claim 22, wherein the linear chain of qubits comprises eight qubits.

30. The method of claim 22, wherein the linear chain consists of a first number of qubits, and the layers of matchgates consist of a second number of layers, and wherein the second number is less than or equal to half the first number.

31. The method of claim 24, wherein the linear chain consists of a first number of qubits, and the layers in the block consist of a second number of layers, and wherein the second number is less than or equal to half the first number.

32. The method of claim 22, wherein the initial state correspond to a quasiparticle vacuum state.

33. The method of claim 24, wherein the quantum circuit further comprises gates configured to perform a rotation on each qubit of the linear chain in advance of the block.

34. The method of claim 22, wherein the plurality of matchgates is arranged in two sequential groups, the matchgates of each group being applied in parallel.

35. The method of claim 24, wherein the plurality of two-qubit gates is arranged in two sequential groups, the gate of each group being applied in parallel.

* * * * *